(12) United States Patent
Lovell

(10) Patent No.: US 7,118,608 B2
(45) Date of Patent: Oct. 10, 2006

(54) SELF-POWERED, WEARABLE PERSONAL AIR PURIFIER

(76) Inventor: William S. Lovell, 6435 N. E. Neptune Dr., Lincoln City, OR (US) 97367-9456

( * ) Notice: Subject to any disclaimer, the term of this patent is extended or adjusted under 35 U.S.C. 154(b) by 0 days.

(21) Appl. No.: 10/823,462

(22) Filed: Apr. 12, 2004

(65) Prior Publication Data
US 2005/0223902 A1 Oct. 13, 2005

(51) Int. Cl.
*A61L 9/20* (2006.01)
*A61M 16/06* (2006.01)

(52) U.S. Cl. .................. 55/385.1; 55/486; 55/DIG. 33; 55/DIG. 35; 55/482; 55/485; 55/467; 55/471; 55/472; 55/473; 95/273; 96/223; 96/226; 96/134; 96/143; 96/108; 128/200.24; 128/200.28; 128/201.25; 422/177; 422/178; 422/179; 422/180

(58) Field of Classification Search ............. 55/486, 55/DIG. 33, DIG. 35, 385.1, 482, 485, 471–473, 55/467; 96/223, 226, 134–143, 108; 128/200.24, 128/200.28, 201.22, 205.29, 206.17, 201.25; 95/273; 422/177–180
See application file for complete search history.

(56) References Cited

U.S. PATENT DOCUMENTS

| | | | |
|---|---|---|---|
| 2,614,654 A | | 10/1952 | Strinden |
| 3,722,182 A | | 3/1973 | Gilbertson |
| 3,870,495 A | | 3/1975 | Dixson et al. |
| 3,883,637 A | | 5/1975 | Benedict |
| 3,971,373 A | | 7/1976 | Braun |
| 4,207,291 A | | 6/1980 | Byrd et al. |
| 4,277,443 A | * | 7/1981 | Van der Smissen et al. 422/122 |
| 4,334,901 A | * | 6/1982 | Ayes et al. ............. 55/487 |
| 4,462,399 A | | 7/1984 | Braun |
| 4,530,706 A | * | 7/1985 | Jones ................. 96/117.5 |
| 4,610,703 A | | 9/1986 | Kowalczyk |
| 4,629,482 A | | 12/1986 | Davis |
| 4,658,707 A | | 4/1987 | Hawkins et al. |
| 4,722,747 A | | 2/1988 | Armbruster |
| 4,790,306 A | | 12/1988 | Braun et al. |
| 4,917,862 A | | 4/1990 | Kraw et al. |
| 5,004,487 A | | 4/1991 | Kowalczyk |
| 5,033,465 A | | 7/1991 | Braun et al. |

(Continued)

OTHER PUBLICATIONS

Real Goods. realgoods.com/shop, 3 stage auto filter using activated carbon, electret charged medium, and a Zeolite VOC.

(Continued)

*Primary Examiner*—Duane Smith
*Assistant Examiner*—Minh-Chau T. Pham

(57) ABSTRACT

A self-powered, personally wearable air purifier includes a sequence of packed bed filter media packets having filter media therein of specifically targeted types that will absorb those ambient air pollutants that have been identified as being particularly dangerous to human health. A HEPA filter is included for the removal of particulate matter that will have adhered thereto many of such pollutants. Media types can be selected to meet different environmental circumstances, including normal highway or city center air, or terrorist attacks of chemical, biological or "dirty bomb" types as on a battlefield or similar environments. Shoulder straps and a chest strap are provided for wearing the apparatus on a user's back, or other means such as a shoulder pouch can also be employed. Emergency substitution of filter media using thermal insulation from the clothing of the user is available upon depletion of the normal media material.

22 Claims, 8 Drawing Sheets

U.S. PATENT DOCUMENTS

| | | |
|---|---|---|
| 5,035,240 A | 7/1991 | Braun et al. |
| 5,042,997 A | 8/1991 | Rhodes |
| 5,063,926 A * | 11/1991 | Forsgren et al. ........ 128/206.17 |
| 5,165,395 A * | 11/1992 | Ricci ..................... 128/202.22 |
| 5,192,346 A | 3/1993 | Kowalczyk |
| 5,221,292 A | 6/1993 | Aoyama |
| 5,509,853 A | 4/1996 | Wells |
| 5,620,545 A | 4/1997 | Braun et al. |
| 5,656,368 A | 8/1997 | Braun et al. |
| 5,683,478 A | 11/1997 | Anonychuk |
| 5,753,343 A | 5/1998 | Braun et al. |
| 5,762,665 A | 6/1998 | Abrahamian et al. |
| 5,763,078 A | 6/1998 | Braun et al. |
| 5,804,295 A | 9/1998 | Braun et al. |
| 5,810,896 A | 9/1998 | Clemens |
| 5,879,423 A | 3/1999 | Luka et al. |
| 6,010,766 A | 1/2000 | Braun et al. |
| 6,136,057 A | 10/2000 | Dang et al. |
| 6,742,518 B1 * | 6/2004 | Chang .................. 128/205.29 |
| 6,840,986 B1 * | 1/2005 | Koslow ..................... 96/135 |

OTHER PUBLICATIONS

Real Goods. ( same) Auto ionizer to help precipitate air Pollutants.

Heinz H. Bitterman article "History and World Wide Trends in Cabin Air Filter Testing" Fluid/Particle Sep. Journal, vol. 3,No. 2 Aug. 2000.

Tadeusz Jaroszcyk et al. article, Filtration Performance. Fluid/Particle Sep. Journal. vol. 3,No. 2, Aug. 2000.

Tadeusz Jaroszcyk et al. article Media Needs for Automotive Cabin Air Treat. Filtration 98 Conf. Amer. Filtration & Separation Society.

Yogic et al. article"Road Test of Car Cabin Filters in Japan". Fluid/Particle Separation Journal vol. 11 No. 1, Apr. 1998.

Samuel E. Lee et al. article "Odor Filter Design Process". Fluid/Particle Separation Journal,vol. 9,No. 3, Oct. 1996.

Olaf Kievet article "Cabin Air Filter Loading under Real-Life Conditions" Amer. Filtration and Separation Society. vol. 11, 1997.

Web Site www.epa.gov/ttn/amtic, under the heading "A final draft copy of the"Particulate Matter (PM2.5) Spec. Guidance Document.

* cited by examiner

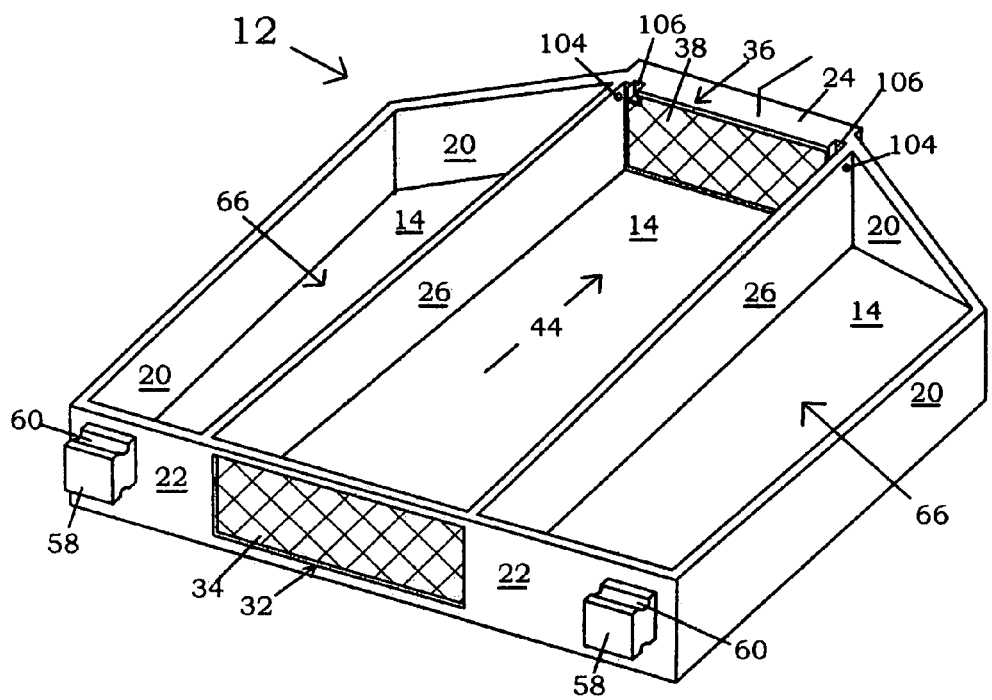
Fig. 2
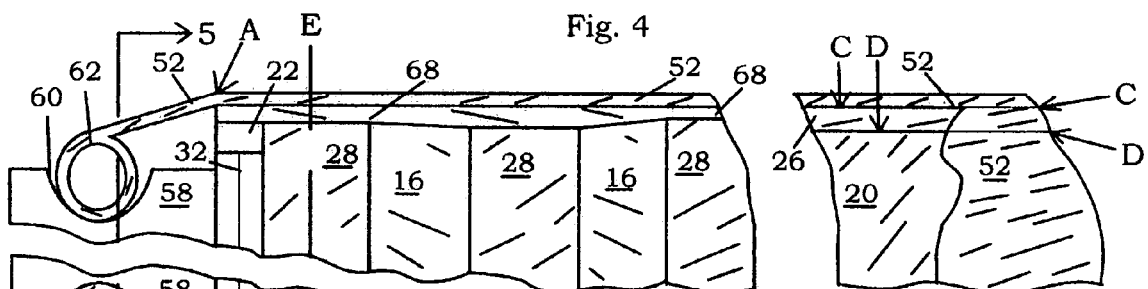
Fig. 4
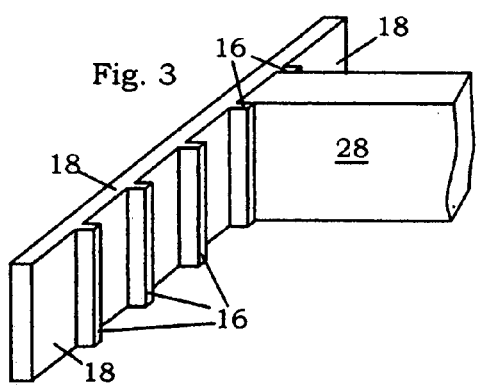
Fig. 3
Fig. 5

Fig. 21
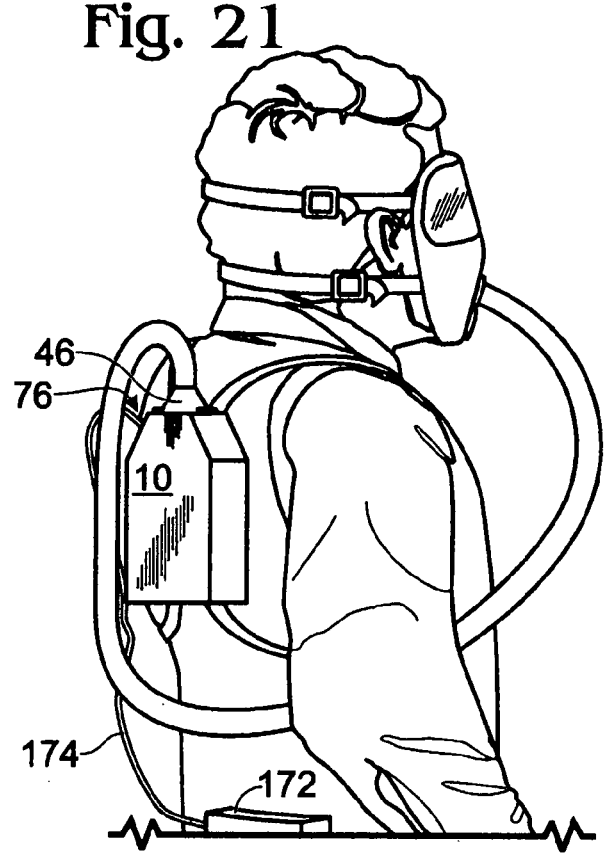
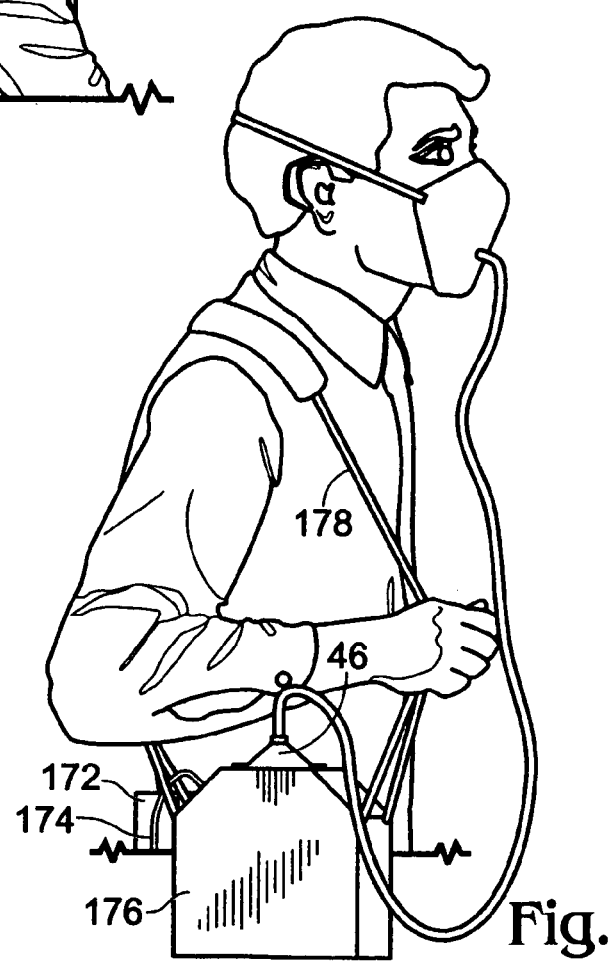
Fig. 22

SELF-POWERED, WEARABLE PERSONAL AIR PURIFIER

CROSS-REFERENCE TO RELATED APPLICATIONS

This application claims the priority of Application No. PCT/US02/32616, filed 11 Oct. 2002, in the United States Receiving Office.

STATEMENT REGARDING FEDERALLY SPONSORED RESEARCH OR DEVELOPMENT

Not Applicable

SEQUENCE LISTING

Not Applicable

BACKGROUND OF THE INVENTION

1. Field of the Invention

This invention relates to the field of air purification, more specifically to the removal from ambient air of pollutants that have been identified as being particularly dangerous to human health, and more especially to wearable air purification apparatus that can be used by individuals and are self-powered. More specifically, the invention relates to that area of the field pertaining to actively forcing ambient air through an air purifying apparatus, wherein the apparatus is self-powered by including batteries therein, but can also be connected to external sources of power such as a motor vehicle battery. The purified air so provided is then to be directed to a face mask or the like for breathing, or beneath an airtight outer clothing layer for body protection.

2. Description of Related Art

General Background

On 9 Feb. 2001 (09.02.2001), Marie D. Lindsay filed under the Patent Cooperation Treaty (PCT) an application for a "PORTABLE MOTOR VEHICLE CABIN AIR PURIFIER" that was published on 13 Sept. 2001 (13.09.2001) with the International Application Number PCT/US01/04241, but has now been issued as U. S. Pat. No. 6,773,477. The present invention adopts some of the features of the device that the aforesaid application shows and describes, including packed bed filter media packets that are similar to but of a different structure from those of the Lindsay device, the types of filter media, and their sequencing, so that information has already been made available to the public whereby a person of ordinary skill in the art could make and use the same in the same manner as with respect to the present invention.

The principal features of the Lindsay invention are that (1) it is portable and readily adaptable for quick placement in any motor vehicle cabin (or indeed any enclosed, habitable space having the necessary power source); (2) it employs filter media that have been selected specifically to remove from ambient air those pollutants that have been identified by the U. S. Environmental Protection Agency as being dangerous to human health(and similarly other pollutants that have been classified as being carcinogens); and (3) the filter elements that contain such filter media have a "filter media packet" structure of the packed bed type in which (a) the granular or similar medium is surrounded and held in place under pressure by a sheet of non-woven filter material on each side; and (b) a grate on each side of that structure both maintains that pressure and includes therein a pattern of holes through which the ambient air to be purified will pass, the outward extension of that non-woven filter material through those holes serving to indicate when the filter medium has in fact been sufficiently packed between those plates, in that portions of the filter medium (encased by that non-woven filter material) are forced to project outwardly to form "bubbles" that give a visual indication of the desired full and even packing.

However, the Lindsay device is not convenient for nor adapted to, nor does it address, the matter of providing purification of the ambient air that will be breathed by the inhabitants of a motor vehicle once they get out of the vehicle cabin and are out onto the streets. The Lindsay device requires an external source of power, hence does not lend itself to any kind of "walk-about" portability, which presents operational requirements that the Lindsay device had not sought to meet. The Lindsay device also requires the use of tools for entry therein for purposes of maintenance, entry being by way of bolts or screws or the like that along with other aspects of the construction also introduce some amount of air leakage. For some temporary protection when walking about, various types of gas mask, respirators or "air filters" are available, but such devices are often of limited effectiveness, especially with respect to long term exposure.

Indeed, one may identify three general types of apparatus for providing purified air, which include both passive and active types, wherein by "active" is meant a device that itself conveys a breathable gas to the user without that user relying solely on lung power (and is commonly known as the "supplied air respirator ("SAR"). A passive type is again the gas mask, respirator or air filter, which includes: the simple filter that places a "dust filter" over the mouth and nose, as for dust-laden or other environments thought to contain harmful contaminants; the respirator that also covers the mouth and nose but may either include a canister of some filter material on its air intake or place such filter material on both sides of the face mask itself; or the "gas mask" that covers the entire face and also includes a canister or other configuration of filter material on its air intake. One active type would be the oxygen mask as employed on airplanes, which has a simple mask to fit over the mouth and nose to which oxygen under pressure is supplied from the airplane, generally through an air bag. Similar to the oxygen mask as an active type is the "SCUBA" gear, or "Self Contained Underwater Breathing Apparatus," which has a waterproof face mask to which is connected an oxygen tank, again under pressure. These active types, however, have the disadvantage that they must themselves act as the source of the air (or actually oxygen) to be breathed, either through connection to an airplane or to a heavy and bulky oxygen tank worn on the back, devices similar to SCUBA gear also being employed, e.g., by workers such as firefighters or hazardous material (HAZMAT) responders.

Patents

Particular patents known to the inventor that relate to air purification will now be described. Those relating to the purification of the air in motor vehicles are included since they help to illustrate the problems presented by the mobility of people, whereas those relating to fixed installations of air purification systems, as in office buildings, industrial plants, homes or the like are generally not included except insofar as they may contain information pertaining to specific types of air filters and the media used therein. The patents noted below are those that were cited in the Lindsay application, another five deriving from the Patent Cooperation Treaty search resulting from that application, and finally another group of six patents deriving from a more recent search.

U.S. Pat. No. 3,722,182 issued 27 Mar. 1973 to Gilbertson touches on the use of an air filtering device mounted on the rear window deck of an automobile and functions independently of the heater/air conditioner/air intake (plenum) system of the vehicle. (An alternative embodiment that connects directly to the air intake of the vehicle is also described.) For removal of particulate matter, the device employs electrostatic plates, although in the more recent state of the art it is known that HEPA filters better serve that purpose, and do not require the frequent cleaning or replacement that is necessary for electrostatic systems.

U.S. Patent No. 3,883,637 issued 13 May, 1975 to Benedict describes an activated charcoal filter element having dispersed therein mixtures of copper and chromium oxides, chromates, dichromates and the like for purposes or removal of H2S and catalytically, similar air-borne sulfur compounds such as mercaptans, organic sulfides, thiophene compounds, thioethers and organic sulfoxides.

U.S. Patent No. 3,870,495 issued 11 Mar. 1975 to Dixson, et al. describes the use of non-woven fibers of wood, paper, hemp and the like to avoid having periodic gaps in the material as is characteristic of woven fabrics. Secondly, the filters are used in multi-layer or laminated form so as to eliminate the effects of any gaps that might be present as a result of manufacturing imperfections with respect to particular pieces of fabric.

U.S. Pat. No. 4,207,291 issued 10 Jun. 1980 to Byrd et al. describes the use of a fabric substrate impregnated with MnO2 for the removal of ozone from the air in aircraft cabins.

U.S. Pat. No. 4,610,703 issued 9 Sep. 1986 to Kowalzyk describes a single filter installed within a vehicle heater/cooling system.

U.S. Pat. No. 4,629,482 issued 16 Dec. 1986 to Davis describes a portable air purifier for use in the rooms of buildings (as opposed to vehicle cabins) that employs a HEPA filter for particulate removal and operates on AC power. The need to replace the filters after long use is shown to the user externally by the appearance of a pulsation in the air flow rate. At an initial stage with a clean filter, operation occurred at a measured air flow rate of 350 cubic feet per minute (CFM).

U.S. Pat. No. 4,658,707 issued 21 Apr. 1987 to Hawkins et al. describes an air purifier for vehicle interiors, disposed principally within the headliner, that includes a fan and smoke filters, together with a smoke detector that automatically initiates operation of the device upon the detection of smoke.

U.S. Pat. No. 4,722,747 issued 2 Feb. 1988 to Armbruster describes an air filter system to be mounted by bolts beneath the roof of a vehicle and including a pair of blowers dispersed at opposite ends of the device for blowing out air, an air intake opening in the middle, and both foam and activated charcoal filters interposed there between.

U.S. Pat. No. 4,917,862 issued 17 Apr. 1990 to Kraw et al. describes a filter system for the removal of mercury, bacteria, pathogens and other vapors, especially with respect to mercury vapors in a dental office. A sequence of filters includes a fibrous pre-filter, then a filter having a honeycomb structure or the like, within which a plurality of cells are partially filled with activated carbon pellets, and then preferably a post-filter. The quantity of pellets introduced may lie between 30% and 94% of the total cell volume, whereby the pellets are "swirled" in the air stream passing through the filter, this motion of the adsorbent pellets being intended to increase adsorbent—adsorbate contact. Operation of the device at air flow rates of at least 740 CFM is said to be preferred, although operation at rates up to 1204 CFM is also noted.

U.S. Pat. No. 5,004,487 issued 2 Apr. 1991 to Kowalzyk describes an air filter assembly for use in passenger compartments of motor vehicles that is installed within the vehicle heating/cooling system and is air pressure driven to clean the air coming into the vehicle. A sensor provides warning when the filter needs cleaning or replacement.

U.S. Pat. No. 5,192,346 issued 9 Mar. 1993 to the same inventor (Kowalzyk) employs a pleated flat filter to permit greater air flow.

U.S. Pat. No. 5,042,997 issued 27 Aug. 1991 to Rhodes describes an environ-mental control system for a building which includes an air filter that has a series of particulate filters and a chemical and activated charcoal filter.

U.S. Pat. No. 5,221,292 issued 22 Jun. 1993 to Aoyams describes an air cleaning system for vehicle passenger compartments which includes two air cleaners: a single air cleaner for cleaning passenger compartment air when the pollution level is low; and a second cleaner for conditions of high pollution within the vehicle is drawing in and cleaning outside air, while the first cleaner discharges compartment air to the outside.

U.S. Pat. No. 5,683,478 issued 4 Nov. 1997 to Anonychuk describes an air filter device featuring a bottom base unit having a hollow cylindrical filter unit to be housed within an existing blower motor assembly under the hood of a car.

U.S. Pat. No. 5,879,423 issued 9 Mar. 1999 to Luka et al. describes a filter system having a filter body in the form of a plate-like filter element exemplified by an "active carbon mat" disposed between at least two planar frame parts, wherein two such frame parts enclose the filter element and are then held together by snaps, the structure further permitting construction of an array of such filter elements in series, and the system as a whole being intended to be part of the air conditioning system of the vehicle.

U.S. Pat. No. 2,614,654 issued 21 Oct. 1952 to Strinden describes an air intake assembly for motor vehicles employing a pair of air inlets, with no specific reference to specific types of filter material, and having a complex structure involving wire ties and beads to prevent rattling, is quite distinct from the more simple structure described herein.

U.S. Pat. No. 5,810,896 issued 22 Sep. 1998 to Clemens describes an air purification system to be contained within the interior of a vehicle cabin. A plurality of air filters is arranged in series within an air passageway, the preferred sequence thereof being described as constituting firstly a pre-filter or course filter (a non-woven material), then an activated charcoal filter; and finally an ultra-fine (i.e., HEPA) filter, these characterizations being directed mostly towards the capture of particulate matter only, except that the activated charcoal filter is also further characterized as to its capturing "hydrocarbons, odors, and other noxious gasses," but without any further speciation.

U.S. Pat. No. 5,762,665 issued 9 Jun. 1998 to Abrahamian et al. describes a vehicular air purification system having both a "passive" (non-motor driven) units and an "active" (motor driven) unit. The active unit can be removably attached within the vehicle, as being specifically designed for attachment to a sun visor. The active unit evidently contains a single carbon-impregnated filter, while the passive units, each evidently again containing a single filter, are adapted to connection onto various vehicle air vents.

U.S. Pat. No. 6,136,057 issued 24 Oct. 2000 to Dang et al. describes a ventilation and circulating system for motor vehicles that includes in sequence therein a carbon filter and a HEPA filter.

U.S. Pat. No. 5,509,853 issued 23 Apr. 1996 to Wells describes an apparatus to be installed onto and used in conjunction with a motor vehicle, but the purpose and resultant structure of which are directed towards cleaning up the ambient air through which the vehicle may be driven, i.e., as to that outside air itself, and not to air entering the vehicle. The air purifying means are made up of absorbent pellets contained within mesh or mesh-like receptacles distributed around the engine block of the vehicle.

U.S. Pat. No. 3,971,373 issued 27 Jul. 1976 to Braun describes a particle-loaded microfiber sheet and the use thereof in a respirator. The sheet is made of a web of very fine fibers prepared by extruding molten fiber-forming material through fine orifices in a die into a high velocity gaseous stream that contains the sorbent particles. The fibers and sorbent particles intermix within the stream and then adhere together to form the sheet.

U.S. Pat. No. 4,462,399 issued 31 Jul. 1984 to Braun describes an air filter cartridge for use in the helmet of a powered air respirator. The cartridge has an entrance at one end for attachment to an air discharge port of a fan motor housing assembly, wherein the filter media is sealed about its periphery to a trough-shaped frame, and the frame and filter media enclose a contaminated air plenum bounded by the inside surfaces of the bottom and side walls of the frame and the under surfaces of the filter media. Contaminated air from the discharge port is forced under pressure through the plenum and then distributed under pressure to and through the filter material to provide purified air. The air circulating means are disposed within a dome-shaped cavity beneath the protective outer shell of a hard hat.

U.S. Pat. No. 4,790,306 issued 13 Dec. 1988 to Braun et al. describes a resin mount for placing a filtration element within a respiratory mask, and also a method of making such a filtering device. The filtration element, which may be porous, rigid, or semi-rigid, is integrated into the face piece, with or without a barrier layer between the filtration element and the face piece made of a thermoplastic resin interposed therebetween (on the peripheral surface of the filtration element). A subsequent injection of resin, with the filtration element within a mold, and which resin penetrates only minimally into the filtration element, is used to form the face piece to which the filtration element thus becomes bonded.

U.S. Pat. No. 5,033,465 issued 23 Jul. 1991 to Braun et al. describes a bonded sorbent structure and the use thereof in a respirator. "The bonded adsorbent structures are made by combining adsorbed granules and polymeric binder particles by controlled compaction porous unitary structures of uniform and controlled density and air permeability throughout resulting in uniform low pressure drop and air flow across the entire structure." (Col. 3, I. 24–29).

U.S. Pat. No. 5,035,240 issued 30 Jul. 1991, to Braun et al., describes a type of non-woven filtration material for the removal of particulate matter from ambient air that is useful as a prefilter on respirators, and such a respirator is also described. The material is formed specifically as thermoplastic elastomeric melt-blown small diameter fibers. The filtration properties of the product can be adjusted by fiber size selection, and also by incorporation therein of crimped spacing staple fibers, electrically charged or chargeable fibers, or fibrous clusters into the web matrix, or also sorbent particulate material.

U.S. Pat. No. 5,620,545 issued 15 Apr. 1997, to Braun et al., describes a method of making a corrugated nonwoven web of polymeric material intended for use in face masks, and includes a filter for removing particulate matter and gaseous contaminants from a fluid, e.g., ambient air. The present invention does not relate to face masks, but only to filtration of the air before it reaches the mask, and in any event the nonwoven material used in the Personal Air Purifier itself is not corrugated. However, provision is made in the Personal Air Purifier to use one or more of the filter media packets thereof for the emergency addition of another filter packet in which the filter material, that can be either of or like that of this Braun et al. '545 and the other Braun et al. patents noted herein, is taken from the thermal insulation in the clothing of the user in the event the filters then in use have been exhausted.

U.S. Pat. No. 5,656,368 issued 12 Aug. 1997, to Braun et al., describes another face mask having a corrugated polymeric microfiber filter layer, and likewise relates to the present invention in the same way stated as to the preceding Braun et al. '545 patent. U.S. Pat. No. 5,753,343 issued 19 May, 1998, to Braun et al., describes another nonwoven polymeric fiber and method of making the same, with emphasis on the manner of attachment of the fiber to a corrugated frame, again for use in a face mask.

U.S. Pat. No. 5,763,078 issued 9 Jun. 1998, to Braun et al., describes a filter system including a first filter formed from a corrugated nonwoven polymeric microfiber, and a second filter containing a sorbent material, this system to be incorporated into a respirator. That structure, of course, is unrelated to the kind of back or shoulder held air purifier of the present invention.

U.S. Pat. No. 5,804,295 issued 8 Sep. 1998, to Braun et al., describes a fibrous filtration face mask having a corrugated polymeric microfiber filter layer, this structure again being unrelated to the Personal Air Purifier.

U.S. Pat. No. 6,010,766 issued 4 Jan. 2000, to Braun et al., describes a corrugated nonwoven web of polymeric microfiber that again mentions the use of the same material as thermal insulation. However, the structure in which the material is to be employed for the usual air filtration purposes of this Braun et al. '766 patent is unrelated to the Personal Air Purifier that constitutes the present invention and, perhaps because there has been no structure that could accommodate such a practice, including this Braun et al. '766 device itself, no suggestion is made that such material originally having been used in the clothing for insulation purposes could be taken therefrom and used for air filtration purposes as is one feature of the present invention.

U.S. Pat. No. 4,543,112 issued 24 Sep. 1985 to Ackley et al. describes a cylindrical filter of the sorbent type for use in a respirator, wherein the sorbent bed (which may constitute activated charcoal granules) is maintained under compression by retention means which include a resiliently stressed perforated plate. There are placed in sequence within the cylindrical portion of a canister shell (a) a first resilient perforated plate; (b) a first retention filter; ©) a sorbent bed; (d) a second retention filter; (e) a second resilient perforated plate; and finally (e) a cover. Axial pressure is applied to compress the sorbent bed and while the structure so formed is still under compression, an annular edge portion of the cylindrical shell is rolled, using an externally applied roller, into a groove that extends circumferentially around the canister cover whereby to hold the structure together.

U.S. Pat. No. 6,277,182 issued 21 Aug. 2001 to Holmquist-Brown et al. describes a respirator and filter cartridge that uses a bonded sorbent structure for the filter element, which is disposed in a cylindrical housing that in turn attaches to a face piece. By a "bonded sorbent filter element" is meant "a body that includes sorbent granules bonded together by polymeric binder particles to form a rigid porous structure capable of sorbing gaseous contaminants that pass through the filter element." (Col. 3, I. 22–26.) Optionally, the structure will include a particulate filter upstream from the bonded sorbent filter element. A resilient sleeve into which the filter element is inserted is tapered so as to decrease in diameter axially inwardly, and further has a folded edge derived from an annular groove of decreased thickness, whereby the filter element becomes held under compression so as to prevent any air from bypassing the filter element ("channeling").

U.S. Pat. No. 4,046,939 issued 6 Sep. 1977 to Hart describes cellular resin foams that have adsorbent materials and binder material dispersed therethrough so as to form a filter medium for use in garments. The medium so formed will capture various noxious gases, but is permeable to air and water vapor. In a preferred embodiment, an activated carbon impregnated flexible polyurethane foam is laminated to a reinforcing fabric such as a loose knit or woven textile material, thereby to protect against noxious fumes while at the same time allowing to occur the normal interaction of the body with the environment.

U.S. Pat. No. 5,222,488 issued 29 Jun. 1993 to Forsgren describes a respirator filter cartridge having a replaceable filter element in which sealing of the filter element to the cartridge is accomplished by means of a sealing lip and concentric sealing rings, and further including a plurality of ramp-up locking means to hold a cover over the filter element in place once the filter element has been installed.

With respect to these latter patents treating various types of filter elements, those of the packed bed variety appear to provide the highest level of filter medium density, given the limitation on the filter medium density obtainable using the adsorbent loaded non-woven structures such as that of the Braun '373 patent.

Other Sources

Some effort has been made to provide air purification, or at least some attention to vehicle cabin air quality, in add-on or after-market devices. For example, the web site containing realgoods.com/shop/shop.1.cfm?dp=107&ts=1053857 operated by Real Goods offers a three-stage auto air filter that employs activated carbon, an electret charged medium, and a Zeolite VOC ("Volatile Organic Compounds") filter, but the efficacy of the device is not known, other than claiming to recycle the cabin air in about six minutes. The site containing realgoods.com/shop/ shop.1.cfm?dp=107&ts=1053856 from the same company offers an auto ionizer to help precipitate air pollutants, but nothing is said about either air circulation or tested effectiveness. (Both sites visited 17 Dec. 2001.)

With respect to individual air purification devices, the field of industrial safety has long provided a range of back- or belt-worn devices adapted generally for protection against work place pollutants, as illustrated at the site that contains centurionsafety.co.uk/English/respro2.htm (visited 23 Aug. 2002). These are self-powered, are classified as "Supplied Air Respirators" ("SAR"), and the U.S. Occupational Health and Safety Administration has set out standards of performance that they must meet and to which the ultimate performance of the Personal Air Purifier can be compared. These industrial devices themselves, however, are generally associated with safety helmets, have a limited time of continuous use (e.g., over an eight-hour work shift), and are not conducive to use by the general public.

Some technical literature has also addressed cabin air purification, for example, in the article by Heinz H. Bitterman entitled "History and World Wide Trends in Cabin Air Filter Testing," published in *Fluid/Particle Separation Journal*, Vol. 3, No. 2, August 2000, pp. 152–155. This article points out the air test standards currently being employed in Europe, which are then compared to the less stringent U.S. standards. (The article notes, for example, that General Motors vehicles for the European market will have filtration for both particles and odors, whereas the American versions of such vehicles will only have particle filters.) The article also remarks that "if it could be managed to provide filters being effective with diesel soot, a major step to recognizable air quality improvement inside cars would be made," but only the use of activated carbon as a filter material, and not the HEPA filter, which the present data indicates is necessary (to remove the fine particulates onto which many of the other pollutants appear to adhere), is proposed to reach that goal. Bitterman also provides no experimental data collected from moving vehicles, as are the data provided herein.

An article by Tadeusz Jaroszczyk et al. entitled "Filtration Performance of High Efficiency Cabin Filters for Operators' Protection in Dusty Environments," published in *Fluid/Particle Separation Journal*, Vol. 3, No. 2, August 2000, pp. 156–164 (Jaroszczyk I), discusses the cabin air filtration systems of mobile mining equipment with respect to the efficacy of particular filter types, and also both recirculating and air intake ventilation systems. The article discusses minimum air flow rates (e.g., 43 m3/hr=25.3 CFM), a "nominal" air flow rate of 104 m3/h being used in the reported laboratory tests, filter pressure drops (e.g., 20 Pa), and "dust capacity," a parameter for use in high dust environments.

Another article by Tadeusz Jaroszczyk et al. entitled "Media Needs for Automotive Cabin Air Treatment" published in *Proceedings, Filtration '98 Conference, American Filtration and Separations Society*, pp. 123–147 (Jaroszczyk II), sets out criteria that filter media should meet in order to be used in cabin air filtration. Particular stress is given to the constraints that are present in ventilation system filter design, in light of the (presumed) limited space available for such filtration, as well as a perceived need to maintain a high air velocity for purposes of heating, ventilation and air conditioning (HVAC), with the resultant short residence time of the air within the filter system being said to reduce filter effectiveness. The article indicates, e.g., (p. 125), that "conventional high efficiency filters operate at low filtration velocities and excessively large spaces would be required to accommodate these filters in a car," and (p. 126) that "current ventilation system designs do not allow for the incorporation of conventional high efficiency filters (HEPA) typically required if 'lung damaging' particles have to be removed."

The proposed solution, but for which no specific means are given, is noted (p. 130) as follows: "An independent car ventilation system with recirculating air flow should be used to control contaminants from internal sources. Filters in this system can be installed in the trunk, under the roof (in the headliner), or under the seats. Since there is more space in these locations, such filters can be larger than ventilation system filters. A low flow velocity in these filters can be maintained so that high filter and adsorber efficiency can be achieved." The article also discusses odor reduction and the air velocity values used in laboratory tests, indicating(pp. 145–146) that with respect to odor control, "under the flow conditions common in this application, adsorbent media did not have sufficient efficiency and life to remove challenge substances."

An article by Yogic et al., "The Road Test of Car Cabin Filters in Japan," *Fluid/Particle Separation Journal (American Filtration and Separation Society)*, Vol. 11, No. 1, April 1998 (pp. 101–110) describes the testing of a number of filter types, including a two-layer dust removal type having a prefilter mainly composed of polyester fiber and a binder, and a micro fiber layer composed of melt-blown polypropylene. A four-layer type combines that dust removal type with another two layers intended to remove odors, comprising a layer of activated carbon granules disposed on a polyester backing layer. The article also sets out the Japanese Environmental Standard for suspended particulate matter (SPM) (which was said to be satisfied nowhere in Tokyo) and reports roadside measurements made by the Japanese Environment Agency for sulfur dioxide, nitrogen dioxide and hydrocarbons, as well as efficiency data for the various filters derived in this study, but no attempt is made to relate this efficiency study to the achievement of any environmental standard. Road tests of odor perception and dust concentration were also taken, and showed a clear correlation between odor perception and peaks in measured dust concentrations, the observance of these being attributed to vehicle exhaust gas.

An article by Samuel E. Lee, et al. of the Ford Motor Company entitled "Odor Filter Design Process," *Fluid/Particle Separation Journal (American Filtration and Separation Society)*, V. 9 No. 3, October 1996, pp. 185–194, addresses cabin air filtration in terms of (1) the constraints (high air flow, low pressure drop, small package size) placed on any system that will be incorporated into a vehicle HVAC system and (2) customer perception of odors, without reference to any directed attempt to attain positive health benefits or the meeting of air quality standards. The article also states that "in most cases, the odor filter is intended as a customer comfort feature rather than a health and safety feature," and further that the filter design process is to depend significantly on "what the customer wants," which in turn is to be based on market research. Some laboratory comparisons of filter performance, at face velocities of approximately 0.75 m/sec and 340 m3/hr flow rates, are also reported.

This industry emphasis on low pressure drops and customer comfort is probably best shown in a practice noted in the article by Olaf Kievit, "Cabin Air Filter Loading Under Real-Life Conditions," *Advances in Filtration and Separation Technology (American Filtration and Separation Society)*, V. 11, 1997, pp. 192–196, wherein the end of a filter's "useful life" is defined as that point at which the pressure drop exceeds 1040 Pa, which as to one test occurred after only 30 hours. The issue addressed by the present invention is not that of any such pressure drop, but rather the question of whether the filter is still able to reduce cabin air pollution levels to below government standards, under ambient air conditions in which those levels far exceed such standards when the invention is not in use. (It is shown by the present invention that the industry concern for low pressure drops may be misplaced—an air purifier external to the HVAC system of a vehicle can not only be provided, but can be provided so as to add further utilitarian and indeed aesthetic value to the vehicle. Placement of the air purifier external to the vehicle HVAC system eliminates that pressure drop as a major issue of concern.)

The web site that contains epa.gov/ttn/amtic/pm-spec.html, under the heading "A final draft copy of the "Particulate Matter (PM2.5) Speciation Guidance Document," at pp. 24–31 (pp. 15–22 as printed), describes in detail the general characteristics of PM2.5 particles, identifies the "target species" for which speciation of the chemical components in test analyses of air is sought by the U.S. Environmental Protection Agency, and in particular identifies a very wide range of pollutants in this PM2.5 category, and their sources, that become a part of our every day air. (Site visited 17 Dec. 2000.)

What is needed, therefore, is a device that is targeted for air purification purposes, thus to use the ambient air itself rather than needing to supply a breathable gas, but that does so actively, so as at least to supplement the lung power of the user. Moreover, such a device should, like SCUBA gear, be "self-powered" in not needing connection to any outside source of power. Of course, the device should provide air purification with respect at least to the same set of pollutants as does the Lindsay device, but would preferably have a form and structure whereby a user could "wear" a "Personal Air Purifier," as in wearing SCUBA gear, that would provide protection against air pollutants that is at least equivalent to that provided by the Lindsay Cabin Air Purifier.

The air volumes required by a single person are less than the 104 ft3 or so of a motor vehicle cabin, but as noted above, in order to provide active air purification when a user is away from a motor vehicle a source of power must be present within the Personal Air Purifier itself. And unlike the airplane oxygen mask or SCUBA gear, that power should be of a convenient type (i.e., other than a gas under pressure), which in the best case will mean electrical power. Especially in the context of terrorist attacks or the like, means must be provided whereby the user can renew that source of power quite rapidly in the event of emergency, and without the use of any tools since such tools may not be available under various exigent circumstances. A source of substitute power should also be provided so that when the opportunity arises, the Personal Air Purifier can be connected directly to a power source (as is the Lindsay Cabin Air Purifier) for purposes of power conservation. An overall structure for the Personal Air Purifier must also be found that will be practical and convenient, both as to rapid implementation and immediate use, and then continued use over unpredictable and possibly extended periods of time.

BRIEF SUMMARY OF THE INVENTION

A preferred embodiment of the invention centers on a box-like structure in the nature of a back pack, encased by a flexible and elastic air-tight, sleeve-like cover that is unitary in construction for purposes of that air tightness, and that also permits tool-free access into the device. Within that cover is an elongate main frame having disposed therealong a sequence of filter media packets, a HEPA filter, an air baffle and at least one battery operated fan, all for self-powered air purification purposes. The region within the device which contains that air purification sequence defines an air conduit that accepts ambient air through an air inlet disposed at one end of that structure, the air then passes through that air conduit and its filter sequence, and an air outlet leading out from the opposite end of that air conduit then provides purified air to the user. A number of batteries are disposed along each side of that main frame, outwardly from the air conduit, those batteries being connected to at least one fan through an air speed control switch, and preferably a battery tester is also provided. The device is held onto a user by means of shoulder straps and a chest strap, or by a single shoulder strap in an alternative "shoulder bag" embodiment.

The cover that surrounds the main frame and the components therein is fixedly attached in an air tight manner near to the outlet end of the main frame. At the inlet end of the main frame, that cover is removably attached, also in an airtight manner. The end of the cover at the inlet end of the apparatus can be removed and moved towards the outlet end so as to give access to the interior of the device and the components therein for purposes such as changing filter media or batteries. Additional means for access to the batteries alone are provided by way of an access flap over the battery compartments, whereby that access flap can be lifted open so that single batteries, or if necessary an entire "battery pack," can be replaced rapidly in the event of emergency. That arrangement will also permit the changing of one or more batteries even as the air purifier is being used.

At the outlet end of the Personal Air Purifier the air outlet passes into a narrowing funnel having a hose or tube connector thereon to which may be connected a breathing tube, and that tube in turn may connect to a face filter, gas mask, or other device that covers as least the nose and mouth of a user. Preferably, the device will also include a battery tester to provide an indication of battery condition, thus to help ensure the operability of the apparatus at any time, whether under normal or emergency conditions. That testing can be carried out even as the air purifier is in use.

As will be described in greater detail below, the Personal Air Purifier advances the personal air purification art beyond the respirator, face mask and filtration element(s), and beyond the gas mask, by
  (a) removing the weight of filter media and associated packaging from the face, head and neck of the user;
  (b) allowing only a minimum of interference with vision and other inconvenience to a user by reducing the requirements of what the user must wear on the face to a simple face mask covering the mouth and nose and a connected air hose;
  ©) incorporating a HEPA filter for the removal of particulate matter;
  (d) providing multiple layers of non-woven material for pre-filtering of particulate matter;
  (e) accommodating the use of much greater quantities of filter media;
  (f) permitting the simultaneous use of a variety of filter media;
  (g) allowing the types of filter media employed to be selected for use in anticipation of various kinds of specifically identified pollution threat (i.e., "pollutant speciation");
  (h) providing the air so purified under power as a "Supplied Air Respirator (SAR)";
  (I) permitting an extended time period over which the Personal Air Purifier can be in continuous use, or essentially an unlimited period of use through connection to an external power source;
  (j) providing an adjustable rate of air flow to so as to accommodate different breathing requirements of the user as determined by the user's level of physical activity;
  (k) providing means for quick maintenance of the filter materials and batteries without requiring the use of tools;
  (l) permitting battery testing and the changing of batteries while the air purifier is in use; and
  (m) permitting emergency substitution of the filter medium with the thermal insulation material taken from the user's clothing.

BRIEF DESCRIPTION OF THE SEVERAL VIEWS OF THE DRAWINGS

FIG. 2 is a perspective view of the main frame of the apparatus of FIG. 1.

FIG. 3 is a perspective view showing the relative dispositions of a divider plate, dividers, and a filter media packet as included in the apparatus of FIG. 1.

FIG. 4 is a partially cutaway side elevation view of the apparatus of FIG. 1 showing one end of a cover on the apparatus of FIG. 1 having been longitudinally removably attached thereto.

FIG. 5 is an end elevation view of alternative embodiments of the groove and groove mounts of the apparatus of FIGS. 1, 2 and 4.

FIG. 21 is a representation of the apparatus of FIG. 1 being worn on the back of a user.

FIG. 22 is a representation of an embodiment of the apparatus of FIG. 1 being carried in a bag hung from the shoulder of a user.

DETAILED DESCRIPTION OF THE INVENTION

For an air purifying apparatus such as the "Personal Air Purifier" to be "wearable" means that the apparatus is removably attachable to the user, as in the form of a back pack, shoulder bag or the like. To constitute an "air purifier" means that an apparatus must carry out purification operations on ambient air that has been forced to flow therethrough by power means. To be "self-powered" means that such power means are present within the apparatus itself, as by a battery-driven motor/blower or fans or the like. The Personal Air Purifier thus constitutes what has come to be known as a "Supplied Air Respirator (SAR)."

Figure 1:
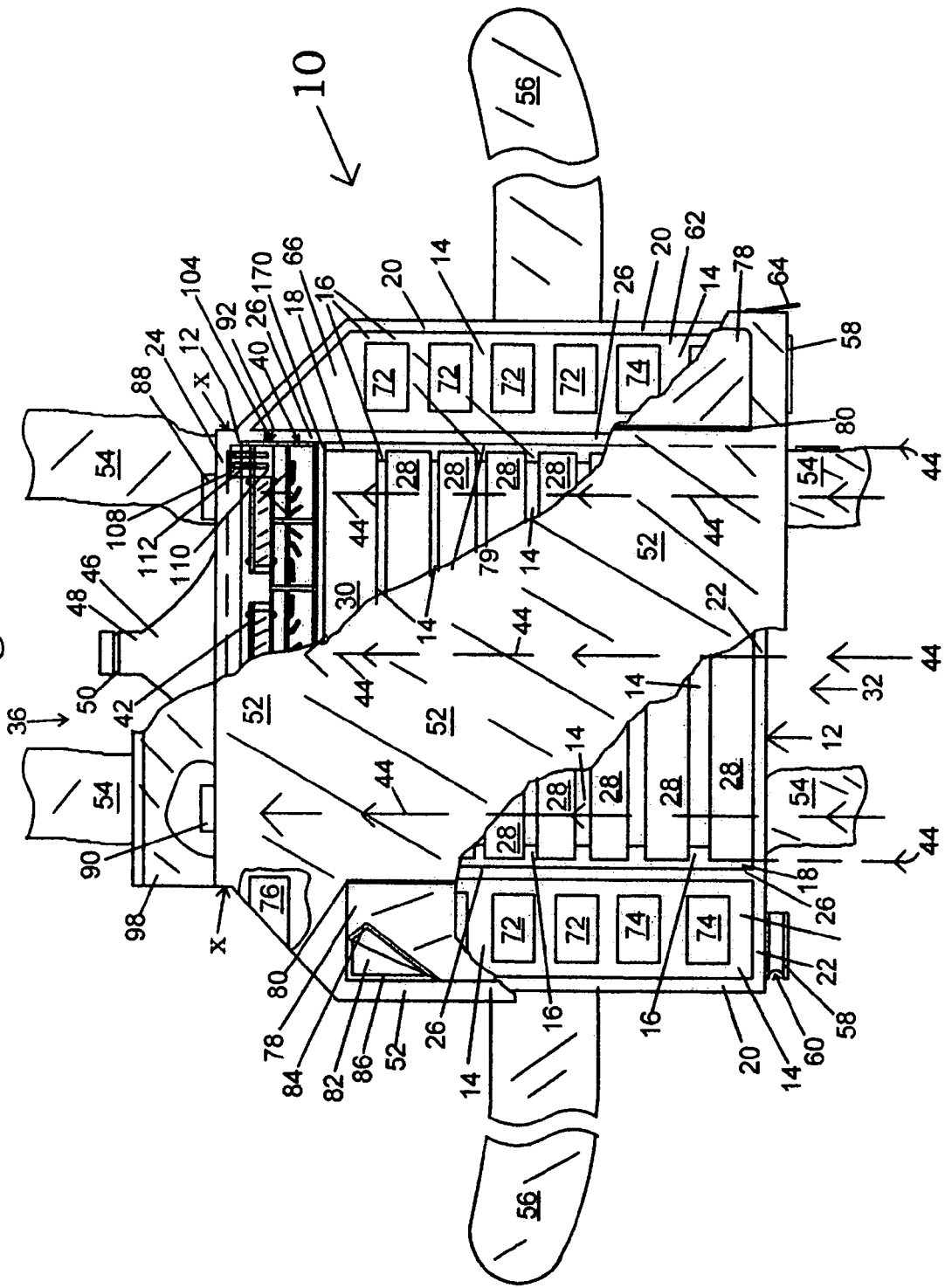
FIG. 1 is a partially cutaway top plan view of a preferred embodiment of the invention.

FIG. 1 shows in a top plan and partially cutaway view a preferred embodiment of the invention, specifically the Personal Air Purifier (PAP) 10. The structure of PAP 10 centers around a hollow, nearly rectangular main frame 12 having a bottom plate 14, and further having disposed longitudinally through a central (measured transversely in FIG. 1) portion thereof a series of longitudinally mutually parallel and transversely mutually facing dividers 16, which are connected on outwardly facing sides thereof in predetermined spaced-apart relationships onto rectangular divider plates 18. Disposed around the periphery of bottom plate 14 and perpendicular thereto are main side walls 20, a first end wall 22 at the input end of main frame 12, and a second end wall 24 at the output end of main frame 12. Main side walls 20 (including a bend in each that will be discussed below) establish the longitudinal extent of main frame 12 and hence of PAP 10. First and second end walls 22, 24 establish the lateral extent of main frame 12 and hence of PAP 10. First end wall 22 is shown in FIG. 1 to have a greater length than the longitudinal extent of main side walls 20, while second end wall 24 is seen to be shorter than the longitudinal extent of main side walls 20. In FIG. 2, on the other hand, the opposite of that relationship is shown. The ratios between those lengths is a matter of engineering choice with respect to particular instances of the invention.

Extending fully between first and second end walls 22, 24 at a pre-determined distance inwardly from main side walls 20, and again extending perpendicularly from bottom plate 14, there is longitudinally disposed in a spaced-apart, mutually parallel relationship a pair of transversely central interior walls 26. First and second end walls 22, 24, together with both of interior walls 26, define the region of an air conduit, as will be discussed more fully below.

The transversely outwardly facing surfaces of the two divider plates 18 are seen in FIG. 1 to abut against respective inwardly facing surfaces of interior walls 26. Transversely outwardly facing surfaces of dividers 16 on both sides of PAP 10 are seen to be connected to transversely inwardly facing surfaces of respective divider plates 18. When taken together, dividers 16 and divider plates 18 are disposed so that the inwardly facing surfaces of dividers 16 face one another transversely across the region between interior walls 26, hence the regions between longitudinally adjacent dividers 16 on both sides establish a rectangular space for the introduction of air filtering means, which in PAP 10 consists of a series of filter media packets 28 followed by a HEPA filter 30. To help clarify these relationships, FIG. 3 shows a set of dividers 16 connected to a divider plate 18, and between one pair of dividers 16 is shown one end of an exemplary filter media packet 28.

As best seen in FIG. 2, an air inlet 32 having an included input air grate 34 is disposed within first end wall 22 at the input end of PAP 10, and an air outlet 36 having an included outlet air grate 38 is disposed at the opposite end of PAP 10 within second end wall 24. Ambient air is caused to flow into PAP 10 through air inlet 32, then through filter media packets 28, HEPA filter 30, and finally out of PAP 10 through air outlet 36.

More exactly, in the sequence leading from air inlet 32 to air outlet 36, there are first disposed a pre-selected number of filter media packets 28 between successive longitudinal pairs of dividers 16 beginning at first end wall 22, then a HEPA filter 30, and after that an air baffle 40 followed by one or more fans 42 near to air outlet 36. FIG. 1 shows three fans 42, this choice permitting the use of the relatively "thin" box-like structure for PAP 10, since the impetus for air flow (i.e., the force created by fans 42) can be spread out laterally. A single fan with a blade having a diameter sufficient to achieve the same "fan power" as is provided by those three fans 42 would preclude having the narrow depth of PAP 10, e.g., the height of the various walls 20–26 in FIG. 2. The selected design makes PAP 10 easier to wear and renders more easy the stacking together of numbers of the apparatus for shipping and other purposes.

As mentioned earlier, the sequence of filter media packets 28, HEPA filter 30, air baffle 40 and fans 42 may be taken to define an air conduit 44 as shown by the long dashed lines running through FIG. 1 towards the top of the page. Further outwardly from air outlet 36 the air is forced into an air funnel 46 that tapers inwardly so as to change the cross section thereof from the rectangular cross section of air outlet 36 to the smaller, circular cross section of an air pipe 48, which connects at the proximal end thereof to air funnel 46. Air pipe 48 is adapted at the distal end thereof to receive an air hose or tube (not shown) by means of a hose connector 50 to receive connection by such an air hose or tube that may then connect to an air bag and respirator or other such apparatus (not shown) that will ultimately be placed over the face of a user. Although an additional use of PAP 10 now to be noted does not involve any hardware of PAP 10, it should be mentioned that connection of PAP 10 can also be made to an air intake on an airtight outer layer of clothing worn by a user for purposes of protection from the physical effects of such gases as mustard gas.

Whether either or both a face mask and a protective outer clothing layer are used, these must have an exhalation valve so that the air forced therein can be released to the atmosphere. That valve will act entirely as an exhaust valve with respect to connection to, and air pumped into, an outer clothing layer (which involves no lung respiration), and partly so with respect to connection to a face mask or the like, since what will need to be exhausted in that case will include unused purified air that had been forced into the face mask or the like as well as exhalations from the user.

As was also previously mentioned, main frame 12 is enclosed within a flexible and elastic airtight, sleeve-like cover 52 that is generally tubular or sleeve-like in form, but is capable of assuming the generally rectangular cross-section of main frame 12. Cover 52 has shoulder straps 54 connected on the outer back surface thereof near to transversely outward sides thereof so that PAP 10 may be donned by a user, shoulder straps 54 then serving in the well known manner to help hold PAP 10 in place. Shoulder straps 54 will preferably be adjustable in length, and must be attached to cover 52 in a manner that will not compromise the airtight integrity of cover 52. An instance of PAP 10 that was light in weight, as by containing only a minimum number of the batteries previously mentioned, could be attached by a simple Velcro® connection, but a more likely version configured for long time use will require stronger means as will be known in the art.

Optionally, cover 52 may also be provided with a chest strap 56 that would serve to prevent PAP 10 from bouncing around as the user runs or otherwise engages in significant physical activity. The ends of chest strap 56 are interconnected on the front of the user's torso. This connection can be made by a simple belt, by the "snap-in" buckle as used in seat belts for motor vehicles or planes, the two-pronged connectors often seen on luggage, or, since the desired connection is not weight bearing nor likely to undergo much stress, a simple Velcro® connection could work just as well. All such connection means, and similar such means, should be deemed to fall within the spirit and scope of the invention.

Returning now to the structure placed immediately on main frame 12, both FIGS. 1 and 2 show two groove mounts 58 near the transversely outward ends of first wall 22 and extending perpendicularly from main frame 12, i.e., in abutment to the outer surface of first end wall 22. Unlike first end wall 22, each groove mount 58 extends only a small part of the full transverse width of main frame 12 so as to leave the transversely central portion of first end wall 22 free and open for the functioning of air inlet 32.

That is, a groove 60 is disposed along the longitudinally outward side of each groove mount 58, and also in each case along the respective transversely outward sides thereof. As shown in FIG. 4, a cover loop 62, which is resilient and has a substantial restoring force, serves to removably attach the input end of cover 52 to PAP 10 by way placement in grooves 60. Since the availability of ambient air is not at issue, it is not deemed to be important that at a short distance outwardly from air inlet 32, i.e., the distance of outward extension of groove mounts 58, the cross-sectional area that is left open to the outside environment is decreased to an area defined transversely by the distance between groove mounts 58 and vertically by the vertical dimension of groove mounts 58. That area would be increased by reducing the transverse length of each groove mount 58 or increasing the vertical dimensions of groove mounts 58. The transverse length of groove mounts 58 is selected on the basis of ensuring that a length of grooves 60 is provided that will have adequate "holding power" to keep cover loop 62 and hence cover 52 in place. As will be explained more fully below, the vertical dimension of groove mounts 58 is selected in order to ensure that such a removable attachment of cover 52 brings about an airtight connection between cover 52 and first end wall 22.

In more detail, cover loop 62 can made a part of cover 52 by being transversely wrapped around by an end portion of cover 52, and when the ultimate end of cover 52 is wrapped around cover loop 62 and placed against that newly adjacent material of cover 52, permanent connection therebetween can be made by such means as heat bonding or sewing, depending upon the material of which cover 52 is made. Since the end region of cover 52 that extends past first end wall 22 as shown in FIG. 4 no longer encompasses any part of air conduit 44 (which lies inward, or to the right of first end wall 22 in FIG. 4), the connection of cover loop 62 to cover 52 need not be airtight, but must only be physically strong enough to retain that connection with repeated usage. Although cover loop 62 may be in the form of a simple circular loop, it is preferable that it be given a physical bias so that, when not under stress, it will relax into roughly a rectangular shape, thereby to facilitate being wrapped around grooves 60. The same might perhaps be done with cover 52 as well. Alternatively, as also shown to the right in FIG. 5, groove mounts 58 may be formed into an arc at the transversely outward end thereof. Optionally, cover 52 can be provided with external tabs 64 near to cover loop 62, one instance of which is shown at the lower right hand corner of FIG. 1, and preferably on each transverse side thereof, whereby a portion of cover 52 can be pulled outwardly to allow insertion of an implement or a finger under cover loop 62 so as to render easier the movement of the input end of cover 52 towards the output end thereof.

It may be noticed in FIG. 2 that the lesser upward extent of groove mounts 58 from bottom plate 14 compared to the height of first end wall 22 is such as to cause the material of cover 52 to bend down at the line of contact of cover 52 with first end wall 22 (marked in FIG. 2 as point "A"), thereby, because of the tension derived from the stretching of cover 52, to ensure airtight connection along the line of contact of cover 52 with first end wall 22 and maintain the airtight integrity of air conduit 44. The same inward bending is made to occur at the under surface of main frame 12 with reference to bottom plate 14 (marked in FIG. 2 as point "B"), again for purposes of airtight integrity, but also to help provide a plane surface along the bottom of PAP 10 for purposes both of comfort in use and for packaging for shipment and the like. The transversely outward extent of groove mounts 58 being made somewhat less than the transverse extent of main frame 12 as was mentioned earlier was imposed for the same reason.

Even as air inlet 32 and air outlet 36 define the longitudinal extent of air conduit 28, the transverse extent of air conduit 44 is defined by interior walls 26. Disposed transversely outwardly from interior walls 26 are two battery compartments 62 that are thus separated from air conduit 44 by interior walls 26. Similarly to the longitudinal disposition of cover 52 over first end wall 22 as just noted, the transverse airtight integrity of cover 52 is ensured by interior walls 26. That is, interior walls 26 have a greater height than do main side walls 20, and greater also than the heights of filter media packets 28, HEPA filter 30, air baffle 40 and fans 42, so that upon cover 52 being extended over interior walls 26, filter media packets 28, HEPA filter 30, air baffle 40 and fans 42, the inwardly facing surfaces of cover 52 that are in contact with interior walls 26 (marked in FIG. 4 as point "C") will be drawn sufficiently tightly against the tops of interior walls 26 as to become air tight.

Further as to the requirement of maintaining airtight integrity, in order to take full account of any possible differences arising from the manufacturing process in the heights of filter media packets 28, HEPA filter 30, air baffle 40 and fans 42, whereby some amount of air might then "bypass" or "get around" filter media packets 28, HEPA filter 30, air baffle 40 and fans 42, as shown in FIG. 2 there is provided above the entirety of air conduit 44 a first air blocking sheet 68 that lies over the tops of filter media packets 28, HEPA filter 30, air baffle 40, and fans 42, just beneath cover 52 and within the full longitudinal and transverse extent of air conduit 44. Similarly, a second air blocking sheet 70 can be provided adjacent bottom plate 14 within the area of main frame 12 that defines air conduit 44 so as to lie beneath and in contact with the lower edges of filter media packets 28, HEPA filter 30, air baffle 40, and fans 42, and again within the full longitudinal and transverse extent of air conduit 44. The presence of second air blocking sheet 70 is not necessary for the functioning of the invention, since bottom plate 14 is simply a flat surface onto which the lower edges of filter media packets 28, HEPA filter 30, air baffle 40 and fans 42 will naturally rest tightly as the result of pressure from above, but since second air blocking sheet 70 provides an additional range of compression that would otherwise need to be accommodated by first air blocking sheet 68 alone, the presence of second air blocking sheet 70 does simplify the function of first air blocking sheet 68, as will now be described.

The specific function of first and second air blocking sheets 68, 70, under the force of cover 52, is to be compressed downwardly or expanded upwardly, as the case may be, against the tops of filter media packets 28, HEPA filter 30, air baffle 40 and fans 42 beneath first air blocking sheet 68, against the underside of cover 52 as to first air blocking sheet 68, and against the bottoms of filter media packets 28, HEPA filter 30, air baffle 40 and fans 42 as to second air blocking sheet 70, if present. Any air gaps that might otherwise be present as a result of the fact that not all of filter media packets 28, HEPA filter 30, air baffle 40 and fans 42 may be of exactly the same height will thereby be filled in by the material of first air blocking sheet 68 and that of second air blocking sheet 70, if present.

The resulting structure is shown in FIG. 4 wherein, to the right of first end wall 22 there is first shown a filter media packet 28 of intermediate height, then after the facing end of an intervening divider 16 one of lesser height, and finally after another divider 16 a filter media packet 28 of greater height. The resultant thickness of first air blocking sheet 68 is seen to vary inversely with the heights of those filter media packets 28, and the same would occur as to HEPA filter 30, air baffle 40, and fans 42. In short, the less may be the height of any of these, the greater will be the thickness of that portion of first air blocking sheet 68 lying thereon, and conversely. The material of first air blocking sheet 68 will of course be air impermeable, hence there will be no space above any of the filter media packets 28 (nor above HEPA filter 30, air baffle 40, and fans 42 that appear later in the sequence but are not shown in FIG. 2) through which any air could pass.

That is, upon adding the local thickness of first air blocking sheet 68 to the heights of the top surfaces of filter media packets 28, HEPA filter 30, air baffle 40, and fans 42, a single flat level becomes defined that is coincident with the under surface of cover 52, and no air gaps are left between cover 52 or first air blocking sheet 68 and any of filter media packets 28, HEPA filter 30, air baffle 40 and fans 42. Should there occur an instance of one or more of filter media packets 28, HEPA filter 18, air baffle 40 and fans 42 that was of a sufficiently greater height than the others thereof than could be accommodated by the compression or expansion of first air blocking sheet 68 alone, the presence of second air blocking sheet 70 beneath filter media packets 28, HEPA filter 30, air baffle 40, and fans 42 would provide an additional range of compression or expansion so that the desired single height below the under surface of cover 52 could still be achieved. The airtightness of air conduit 44 is assured specifically by giving to interior walls 26 a height that is greater than the individual heights of all of filter media packets 28, HEPA filter 30, air baffle 40, and fans 42, and of course including the thickness of second air blocking sheet 70 if present. The added thickness of an uncompressed first air blocking sheet 68, i.e., prior to adding the force of cover 52, is intended to bring about a total height of filter media packets 28, HEPA filter 30, air baffle 40, fans 42, first air blocking sheet 68, and second air blocking sheet 70 if present that is somewhat greater than that of interior walls 26. The initial compression of first air blocking sheet 68 caused by adding the force of cover 52 will then block any air passages that may have existed above or below filter media packets 28, HEPA filter 30, air baffle 40 and fans 42.

To illustrate that process further, in the separated portion of PAP 10 on the right side of FIG. 4 there is shown a part of cover 52 along the top of that separated section that extends to the point of contact "bend line C" (shown by a light line) of the underside of cover 52 with the top of interior wall 26, then a "bend line D" (also shown by a light line) at the top of the near main side wall 20, and then down the facing surface of that separated section; secondly, a first cutaway portion on the lower left side of that separated section that shows the near main side wall 20 to lie immediately beneath that facing part of cover 52; and finally a second, deeper cutaway section (to permit a view past near main side wall 20), just above that first cutaway section, to show the top of the near interior wall 26 back within PAP 10, the top of that interior wall 26 again being in direct contact with the underside of cover 52.

Figure 6:
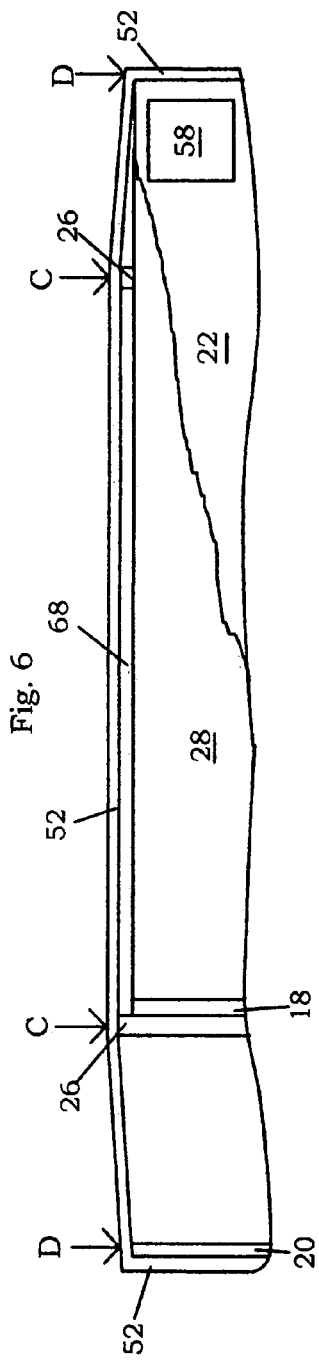
FIG. 6 is a partially cutaway front elevation view of the apparatus of FIG. 1 which shows the manner in which the cover of FIG. 4 is stretched transversely over the apparatus of FIG. 1.

FIG. 6 is a partially cutaway front elevation view of PAP 10 that again shows the manner in which the greater height of interior walls 26 acts to ensure airtight contact between cover 52 and the tops of interior walls 26. The points (or more exactly, the longitudinal lines) of contact between the tops of interior walls 26 and the underside of cover 52 are marked in FIG. 6, as in FIG. 4, by the arrows "C." Just as in FIG. 4, first air blocking sheet 68 is seen in the cutaway portion on the left of FIG. 6 to lie just beneath cover 52, to lay atop a filter media packet 28, and to terminate at each end thereof at the inner edges of interior walls 26, the tops of which are themselves in contact with the underside of cover 52. FIG. 6 shows that the leftward end of this first filter media packet 28 abuts divider plate 18, and FIGS. 4 and 6 show that this same filter media packet 28 precedes a first divider 16 in the direction of air flow.

As to the sides of filter media packets 28, HEPA filter 30, air baffle 40, and fans 42, airtightness is ensured firstly by making the spaces between dividers 16 slightly undersized in comparison to the thicknesses of the filter media packets 28, HEPA filter 30, air baffle 40, and fans 42 that are to be placed therein, such components then needing to be force fit into such placement. Secondly, it can be seen in both FIGS. 1 and 6 that the dividers 16 located on both sides of air conduit 44 connect on each of their own outward facing sides to a divider plate 18, against which are to be placed the left and right ends, respectively, of filter media packets 28, HEPA filter 30, air baffle 40, and fans 42. Similarly to the case of the spacing between dividers 16 relative to the thickness of filter media packets 28, HEPA filter 30, air baffle 40, and fans 42, divider plates 18 are sized so that the distance between the mutually facing (i.e., across the lateral dimension of air conduit 44) portions of the two divider plates 18 that lie between dividers 16 is somewhat less than the lengths of filter media packets 28, HEPA filter 30, air baffle 40, and fans 42. As a result, installation of each of filter media packets 28, HEPA filter 30, air baffle 40, and fans 42 will require a force fit with respect to both thickness and length, thereby to eliminate any space between both of divider plate 18 and dividers 16, on the one hand, and any of filter media packets 28, HEPA filter 30, air baffle 40, and fans 42, on the other. Both dividers 16 and divider plates 18 (which are preferably fabricated as divider 16/divider plate 18 units as shown in FIG. 3) should be formed of an air impermeable and non-rigid material that is both flexible and has a nominal restoring force for ease in installing filter media packets 28, HEPA filter 30, air baffle 40, and fans 42 therewithin.

Cover 52 and first air blocking sheet 68, however, must be provided as separate entities, since the requirements of these two elements are quite different. Firstly, to attach cover 52 and first air blocking sheet 68 together would likely require an adhesive, which is to be avoided since most adhesives suitable for such use will act as a source of volatile organic chemicals (VOCs)as pollutants to the air passing through air conduit 44. Secondly, the properties required of the two elements are quite different. Cover 52 must be quite "stretchable" in order for the removably attachable end thereof to be pulled down to the input end of PAP 10, while also having a fairly high restoring force in order to establish an airtight fit against main side walls 20, first end wall 22 and first air blocking sheet 68 when so installed, while first air blocking sheet 68 need accommodate only a small amount of expansion or compression and have only a small restoring force. Also, if first air blocking sheet 68 were attached to cover 52, any stretching of cover 52 so as to be moved would necessarily stretch first air blocking sheet 68 as well, and thus would detract from the ability of first air blocking sheet 68 to be compressed or expanded to fill in any air gaps between cover 52 and the tops of filter media packets 28, HEPA filter 30, air baffle 40, and fans 42, and might indeed act to pull loose any air blocking already accomplished. In summary, dividers 16 (and hence divider plates 18) will preferably be made of elastomers, a silicone rubber or the like having a low elasticity, first and second air blocking sheets 68, 70 can be made of such a material having a higher elasticity, and the most elastic of such materials will preferably be used for cover 52.

The material used for main frame 12, bottom plate 14, as well as for the frames of filter media packets 28, HEPA filter 30, air baffle 40, and fans 42, should have a very high dimensional stability. Because of differences in the coefficient of thermal expansion of many plastics as compared to those of metals, if plastic is used as the material of main frame 12 and bottom plate 14, then the frames of filter media packets 28, HEPA filter 30, air baffle 40, and fans 42 should be made of the same material. Otherwise, there could be differences in the expansion or contraction of these materials over even the normal temperature ranges of use of PAP 10, which could give rise to new air gaps around filter media packets 28, HEPA filter 30, air baffle 40, and fans 42. (From a nominal temperature of 70 deg. F., one might anticipate use of PAP 10 over a temperature range of +50 deg F. to −100 deg. F. or more.)

Similar size distortions might arise from the use of plastics that absorb moisture, since devices fabricated therefrom can enlarge substantially as a result of any such moisture absorption, perhaps to produce other new air gaps. Because of the various unpredictable environments within which PAP 10 might be used, any such plastic (and indeed all other materials) of PAP 10 should also not be subject to burning, or to dissolution in any fluid with which any contact might be anticipated, especially including water, which may be in the air being purified in a humid environment or in liquid form as precipitation. Cover 52 in particular must be watertight as well as airtight in order to protect PAP 10 in inclement weather. For the reasons previously described, main frame 12, bottom plate 14, and the frames of filter media packets 28, HEPA filter 30, air baffle 40, and fans 42 would preferably be of a non-elastic and indeed rigid plastic, for purposes of ease of fabrication by such means as injection molding or other means as will be known to persons of ordinary skill in the art, and having a low coefficient of thermal expansion along with the other properties previously noted.

Air baffle 40 and fan frame 92 could be fabricated in a large number of ways, but in the preferred embodiment described herein it was elected either to fabricate baffle 40 and fan frame 92 as a single unit, or to fabricate air baffle 40 and fan frame 92 separately, but then to place them side by side in a single "slot" following HEPA filter 30. To reduce the number of manufacturing steps required the unitary fabrication of air baffle 40 and fan frame 92 is to be preferred.

Figure 8:
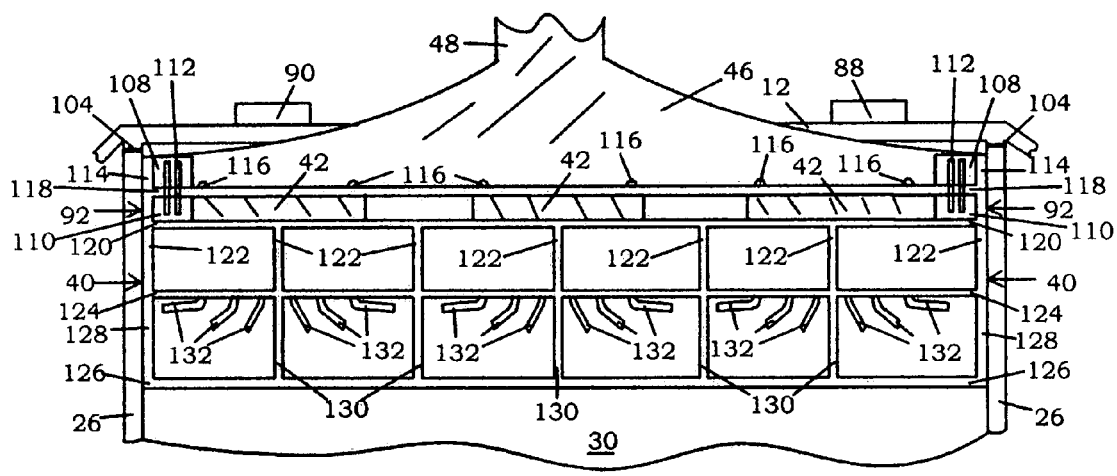
FIG. 8 is a top plan view of an air baffle and fans that form a part of the apparatus of FIG. 1, also showing the manner of connecting electrical power to those fans.

On the other hand, air baffle 40 and fan frame 92 cannot be fabricated unitarily with main frame 12 itself, since it will be necessary from time to time to remove air baffle 40 and fan frame 92 therefrom for installation and/or replacement of fans 42. Spacing between fan frame 92 and air funnel 46 sufficient to allow placement or removal of fans 42 is provided by extending frame end walls 114 of fan frame 92 in the direction of air funnel 46 the needed amount, which will also be reflected in the lengths of fan power plugs 108 as shown in FIG. 8. Fans 42 are installed onto fan frame 92 by means of fan bolts 116 that at each of the four corners of each fan 42 are passed into first fan strut 118 that extends transversely between two frame end walls 114, fan bolts 116 then passing through each fan 42 into a second fan strut 120 that also connects at each end thereof to frame end walls 114, second fan strut 120 lying in a mutually parallel relationship with first fan strut 118 at a distance defined by the thickness of the body of fan 42 and being threaded to receive fan bolts 116. (Second ones of both first and second fan struts 118–120 lie respectively behind each of those that are visible in FIG. 8.)

As also shown in FIG. 8, the longitudinal structure of air baffle 40 and fan frame 92 is provided by a series of fan/baffle braces 122, which extend perpendicularly (downward in FIG. 8) from second fan strut 120 with mutually parallel relationships therebetween. Distal ends of fan/baffle braces 122 then connect to first baffle strut 124, and then at a predetermined distance from second fan strut 120 to a second baffle strut 126 that lies in a mutually parallel relationship with first baffle strut 124. Second baffle strut 126 constitutes the longitudinally peripheral member of fan frame 92 in the direction from which the air to be purified is drawn.

FIG. 8 also shows two baffle frame end walls 128 to which are connected respective opposite ends of first and second baffle struts 124–126, but because of the chosen method of unitary construction of air baffle 40 and fan frame 92, baffle frame end walls 128 are structurally colinear and integral with fan frame end walls 114. The structure of air baffle 40 is completed by a series of what are designated as baffle braces 130 but which, similarly to what was just described with respect to baffle frame end walls 128, are in fact a number of essentially longitudinal extensions of fan/baffle braces 122, lying in a mutually parallel relationship one to the other and also as to baffle frame end walls 128.

Another reason for combining the fabrication of air baffle 40 and fan frame 92 is to have instituted a best positional relationship between air baffle 40 and fans 42, i.e., one that will cause air to be drawn as evenly as possible over the full cross-sectional area of filter media packets 28 and HEPA filter 30, and then to maintain that relationship. The problem, just as in the case of filter media packets 28 and HEPA filter 30, is that the fabrication of air baffle 40, fan frame 92, and indeed dividers 16 and divider plates 18 may not yield products having precisely identical dimensions. If a divider 16 were to be placed between air baffle 40 and fan frame 92, then the precise spatial relationship between air baffle 40 and fans 42 might depend upon which particular instance of divider 16/divider plate 18 structure had been installed in the particular instance of the invention. If there were to be four fans 42 installed instead of three, as by not providing spacing between adjacent fans 42, the structure of air baffle 40 would need to be changed in order to obtain that same even air distribution, since the best spatial relationship would likely also be different.

FIG. 8 thus shows a unitary structure for air baffle 40 and fan frame 92, both of which are rectangular in cross-section and when taken together form another rectangle, sized to fit transversely across air conduit 44 and being contiguous at each end thereof with inwardly facing surfaces of interior walls 26. (Airtightness is not an issue with respect to air baffle 40 and fans 42 as such, since the air passing through those elements will already have been subjected to all of the air purification means that PAP 10 provides, hence no provision is made in this context for the use of divider plates 18.) A preferred method of fabrication of the air baffle 40/fan frame 92 structure might then well be by plastic injection into a single mold.

On each of the opposite sides of the outlet end of PAP 10 in FIGS. 1–2 there is a slanted portion as though two corners of what had been a true rectangle had been removed. That variation in the external shape of PAP 10 is shown in part to illustrate that different external shapes of PAP 10 could be adopted for various purposes without departing from the spirit and scope of the invention, and all such variations should be deemed to fall within the scope of the claims herein. However, availability of the space that would otherwise have been occupied by complete corners of main frame 12 also renders easier the maintenance of PAP 10 in terms of replacement of the internal components thereof. Upon drawing the input end of cover 52 towards the output end thereof, the additional parts of cover 52 that extend outwardly across battery compartments 66 on each side can be forced out of the position shown in FIG. 1 to positions out past the straight parr of main frame 12 (towards the top of the page in FIG. 1). Cover loop 62 can then be placed temporarily around the output end of main frame 12 to hold cover 52 in that position while maintenance procedures are being carried out. Since the area of fixed attachment of cover 52 at the output end of main frame 12 lies outside of air conduit 44, that fixed attachment can be accomplished by glue or the like without concern for the release of VOCs that would contaminate the air being purified. Cover 52 has the same overall shape in terms of having slanted corners as does main frame 12, whereby those slanted portions of cover 52 can be moved away from main frame 12 and provide space for the rest of cover 52.

Figure 7:
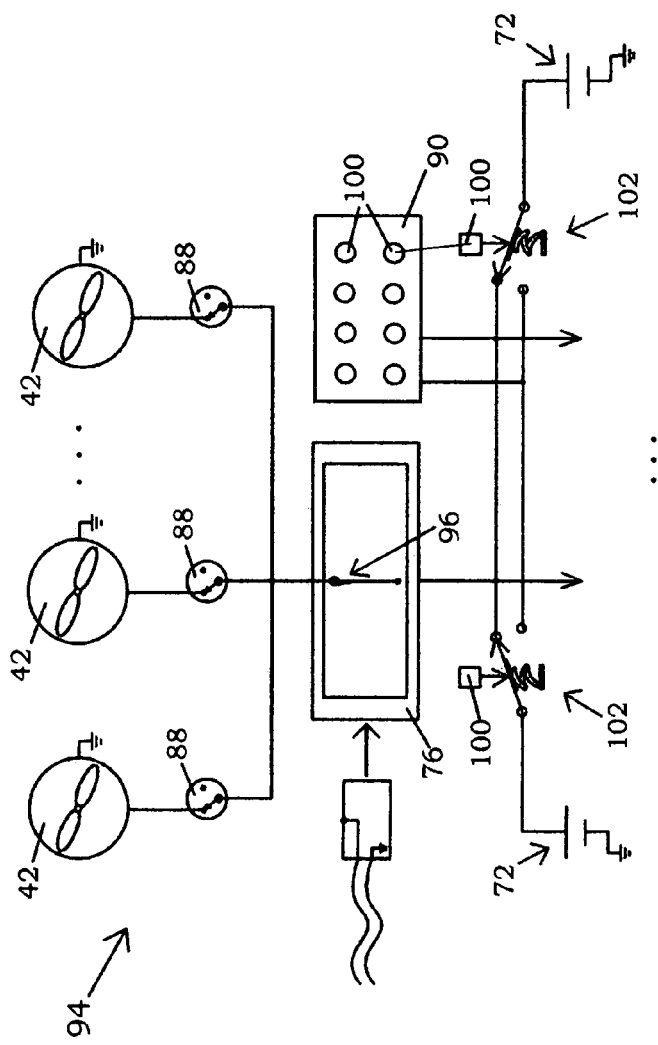
FIG. 7 is a circuit drawing wherein eight 12 volt batteries are arranged to be connectable to three fans, and a battery tester is enabled to test each of those batteries separately.

As mentioned earlier and shown in FIGS. 1–2, a battery compartment 66 is located on each side of main frame 12, each of which battery compartments 66 includes therein an array of batteries 72 together with optional battery holders 74 for storage of spare batteries. The locations of batteries 72 and battery holders 74 will also be accessible when cover 52 is moved towards the outlet end of PAP 10. The absolute and relative numbers of batteries 72 and battery holders 74 shown in FIG. 1 are for illustrative purposes only, and are not to be taken as any limitation on the scope of the invention, since the numbers selected will be a matter of engineering choice in accordance with the needs of anticipated users. Batteries 72 that are to be used for power immediately are connected electrically to fans 42 as shown in FIG. 7, while battery holders 74 can be left unconnected, serving only to hold spare batteries for convenient replacement purposes. This feature can be eliminated in the event of anticipated long term continuous use, so that the batteries held in battery holders 74 would likewise connect to fans 42.

The interconnections of batteries 72 among themselves can be serial or parallel or both, depending upon the voltage ratings of fans 42 and batteries 72. (That is, one might use 12 volt fans and batteries, 12 volt fans and 6 volt batteries connected in series in pairs, and so on.) However, fans 42 and batteries 72 will preferably be of the 12-volt type, since the selection of that type allows a user of PAP 10 to fall back on a 12 volt car battery as yet another source of power should emergency circumstances so warrant. Other kinds of auxiliary power sources, such as separate belt-worn battery packs, can also be used. As shown by the cutaway portion in the upper left hand corner of PAP 10 in FIG. 1, a power inlet 76 is provided to permit connection thereto of a DC power cord as shown further in FIG. 7.

As shown in FIG. 1, to provide additional access to battery compartments 66, battery access flaps 78 are provided on both sides of cover 52, outwardly from interior walls 26 so as to lie over battery compartments 66. Battery access flaps 78 are hingedly attached to cover 52 along a hinge line 80 located just outward from interior walls 26 on each side. An entry aperture 82 is disposed within cover 52 to encompass a portion of the region of cover 52 that is covered over by each of battery access flaps 78. By viewing both sides of PAP 10 as shown in FIG. 1, and in particular those parts thereof that are not cut away, it can be seen that battery access flaps 78 and the other structures associated therewith extend over most of the longitudinal extent of those parts of cover 52 that lie over battery compartments 66, thereby to provide access to battery compartments 66, at least to the areas thereof beneath which lie batteries 72 and battery holders 74.

The periphery of battery access flaps 78, excluding the side thereof that is hingedly attached to cover 52, has disposed on the under side thereof a first attachment means 84, such as one part of a Velcro® connector, and on cover 52, just outside the perimeter of entry aperture 82, is disposed a second attachment means 86 in a mutually facing relationship (when battery access flap 78 is closed) with first attachment means 84, e.g., the "opposite" part of a Velcro® connector or the like, whereby battery access flaps 78 can be lifted up to afford access to batteries 72 and battery holders 74 and then re-closed. Battery access flaps 78 when closed should of course be weather proof, i.e., water tight, but need not be airtight since battery compartments 66 to which access flaps 78 give access do not make any fluid (i.e., air) connection with air conduit 44.

FIG. 1 also shows an air flow switch 88 on the rightward side of the outlet end of PAP 10. Air flow switch 88 can be an ordinary type of speed control switch, or in the case of the embodiment of PAP 10 shown in FIG. 1 that has three fans 42, air flow switch 88 can consist of three independent "on-off" switches that would serve instead to connect just one, or two, or all three of fans 42 to batteries 72 both to provide an "OFF" condition and to permit selection between those three levels of air speed of the air passing through PAP 10. That same switching scheme, or a similar such effect, can also be provided by a single, multi-connector switch, or other such schemes will be readily apparent to a person of ordinary skill in the art.

For purposes of ensuring the ability at any particular time to use a particular instance of PAP 10 over an extended period of time, FIG. 1 shows PAP 10 also to be provided with a battery tester 90, which can be used to test the condition of charge both of installed batteries 72 and of any spare batteries that may be held in battery holders 74, and any batteries 72 found to be weak in power would of course be replaced. One might also use rechargeable batteries, whereby recharging would be carried out when battery tester 90 indicated that one or more of rechargeable batteries 72 had become low in power.

FIG. 7 shows an exemplary battery circuit 94 that interconnects batteries 72, air flow switches 88 (that connect to fans 42), battery tester 90, and power inlet 76 that includes a cutout 96 so as to disconnect air flow switches 88 and hence batteries 72 when a power cord is plugged into power inlet 76. As also shown in FIG. 7, cutout 96 may simply be a spring-loaded connection between batteries 72 and air flow switches 88 that is pushed out of connection when a DC power line is inserted into power inlet 76.

The testing of batteries 72 is made possible by raising weather flap 98, which is shown in FIG. 1 in a resultant "open" condition, but serving when closed to cover the output end of PAP 10 over the full width marked by interior walls 26 (although not being so shown on the right hand side of FIG. 1 because of the cutaway), and thus protect both air flow switches 88 and battery tester 90 from the environment. Of course, raising weather flap 98 also provides access to air flow switches 88 for purposes of turning off the operation of fans 42 in PAP 10, or for adjusting the level or air flow as previously described. The structure and use of weather flap 98 are analogous to those that pertain to battery access flaps 78 as discussed earlier.

Battery tester 90, which may be any of a number of standard types well known to a person of ordinary skill in the art, will become connected to batteries 72 even as batteries 72 become disconnected from air flow switches 88 by depression of battery test buttons 100 that are physically connected to spring loaded battery test switches 102. Although FIG. 7 shows only two of such battery 72 connections for purposes of simplicity in the drawing, i.e., one on each side, the ellipsis at the bottom of FIG. 7 is intended to indicate that additional batteries 72, e.g., three more batteries 72 on each side so as to provide the eight active batteries 72 shown in FIG. 1, would also be so connected, and provision for connection to battery holders 74 can also made. Also, in FIG. 7 the lighter line extending from the "100" box above the right hand test switch 102 to the circle labeled "100" within the battery tester 90 box is intended to show that those two elements are but different methods of illustrating a single thing: depression of a test button 100 within battery tester 90 constitutes pushing a physical test button 100 above a test switch 102, as suggested by the downward arrow that extends below that physical test button 102 onto a spring.

In order to avoid passing wiring from battery compartment 66 into air conduit 44 and thereby possibly affect the airtight integrity of air conduit 44, the wiring from batteries 72 passes through wiring apertures 104 that are disposed within interior walls 26 very near to the outlet end of PAP 10 as shown in FIGS. 1–2, 8, at which location the air purification process would have been completed and the flow of air would be outward. Wiring apertures 104 can also be sealed after the wiring has been passed therethrough, preferably by means that do not introduce any VOCs. On the other hand, connection to fans 42 must necessarily reach into air conduit 44 where fans 42 are located, so that is accomplished in part by providing fan power plug slots 106 (shown in FIG. 2) within main frame 12 and into which, as shown in FIG. 8, fan power plugs 108 are inserted in the course of assembling PAP 10. Fan frame 92 is then provided with fan wiring plates 110 having extending therefrom a number of fixedly attached prongs 112, so that as fan frames 92 are being installed (together, of course, with air baffles 40) into main frame 12, prongs 112 are downwardly pressed into fan power plugs 108, thereby to provide power to fans 42 through air flow switches 88. (The four prongs 112 shown may be taken to be three power lines and a common ground line.)

The locations of fan power plugs 108 and fan wiring plates 110, which of course must "match" so that fan power plugs 108 are in positions to accept prongs 112, is evenly divided between opposite ends of fan frame 92 so as firstly to place the resultant obstacle to air flow that fan wiring plates 110 will necessarily cause at the periphery of the action of fans 42, and secondly at least to render that obstacle symmetrical across the transverse extent of fan frame 92. For purposes of clarity in the drawing in FIG. 8, the actual physical wiring that connects to the proximal ends of prongs 112 and to the external terminals of fan power plugs 108 is not shown, but is instead shown in FIG. 7 as the wiring that connects from batteries 72 to power inlet 76, which (when no power plug has been placed into power inlet 76) connects to air flow switches 88.

In order to obtain an estimate of the length of continuous operation of a battery/fan combination, three Radio Shack Cat. No. 273-244, DC brushless fans, rated at 12 volts, 0.08 amperes, and 0.100 watts, were connected to a single 12 volt Eveready No. 732, NEDA 966 lantern battery and allowed to run continuously. The three fans came to a stop after about 30 hours. When two of those fans were then disconnected, the one fan left connected to that same battery ran for nearly 24 hours more. The Eveready No. 732 battery used in that test is of a size and weight that may not to be easily accommodated by battery compartments 66 as shown, although an embodiment of PAP 10 into which such batteries would fit could easily be fabricated, perhaps to accommodate one or more such batteries or similarly sized rechargeable batteries on each side thereof.

A similar test was then run using a Digital Security Controls, Ltd., lead acid battery BD7-12, rated at 12 volts and 7.0 ampere/hours, shown by the Radio Shack Cat. No. 22-090 9-Range Battery Tester as being fully charged, and connected to the same three fans as were used in the previous test. The speed of operation of the three fans became noticeably slower after 36 hours, and when tested at that time using the same battery tester, the state of charge on the BD7–12 battery indicated that recharging was required. Because of the size and weight of the BD7-12 12-volt battery, consideration might also be given to the use of a somewhat smaller and lighter rechargeable batteries, such as the Radio Shack 23-289A, which is also of the lead acid type and is rated at 12 volts and 5 ampere/hours.

For battlefield conditions requiring frequent exiting of a vehicle, or similarly in law enforcement work, an optimum configuration for long term usage could be that the vehicle has in it a Lindsay Car Air Purifier, and also means for charging batteries, and the Personal Air Purifier would be configured to include four rechargeable 12 volt batteries, two on each side. While in the vehicle the users would either take advantage of the Car Air Purifier (if present) or operate the Personal Air Purifier using power drawn directly from the vehicle cigarette lighter receptacle through power inlet 76, but then turn to the self-powered Personal Air Purifier when the duties required exiting the vehicle. Based on the indicated continuous usability of a chargeable battery of xx hours, the time that a user could be continuously protected from pollutants while working in the field would be limited only by the electrical system of the vehicle, since experience with the Lindsay Car Air Purifier indicates that the lifetime of the various filters as such would far exceed that figure.

Also shown in FIG. 8 is an array of six baffle blades 132 associated with each fan 42. Because of ordinary Brownian Motion, any stream (or body) of air will tend to spread out and occupy as much space as may be available. That process would occur uniformly in all three dimensions unless influenced by an outside force. A rotary fan will develop an air stream that is toroidal in cross-section, in terms of the negative air pressure formed in front of the blades, so air baffle 40 seeks to convert that pattern into a more even, rectangular shape to match the cross-sections of filter media packets 28 and HEPA filter 30 and thereby utilize the materials of those elements more evenly. The reason for seeking such uniformity is that if a certain area in filter media packets 28 and HEPA filter 30 had been receiving a significantly greater flow of air, the filter medium and corresponding space within filter media packets 28 and HEPA filter 30 within that area would be more rapidly depleted, eventually reaching a point at which there was no absorption of air pollutants at all. This statement assumes that a depleted region of the filter medium, even though being saturated with pollutant, would not present an obstacle to air flow even as to pollutant particles.

If that is not the case, as with particulate mtter, an accumulation of which would be expected to block air flow, the result would be equivalent merely to having less absorptive medium, which by itself would not be an extremely critical issue. But if a depleted area allowed pollutant to pass therethrough as mentioned above, depending upon the toxicity of the pollutant being treated, which might include extremely toxic chemical and biological agents, such a failure of filtering capability could have fatal consequences. For that reason, it is just as important to ensure the continuing absorption ability of the filtering means as it is to ensure continuing power to fans 42.

In air baffle 40, a first pair of baffle blades 132 is symmetrically disposeda short distance on both sides of the central axis of each fan 42 that will turn the direction of air input to a small angle from the normal to fans 42, and then two additional pairs of baffle blades 132 that are symmetrically disposed further outwardly from the center of each fan 42 and at angles that are at successively larger angles from the normal to fan 42 will turn that air to successively larger angles away from the normal to fan 42. The orientation of each baffle blade 132 will thus alter the directions that the air being drawn thereto will travel—not to alter the pattern as such at air baffle 40, but rather to construct the desired even "source pattern" at filter media packets 28 and HEPA filter 30.

Figure 9:
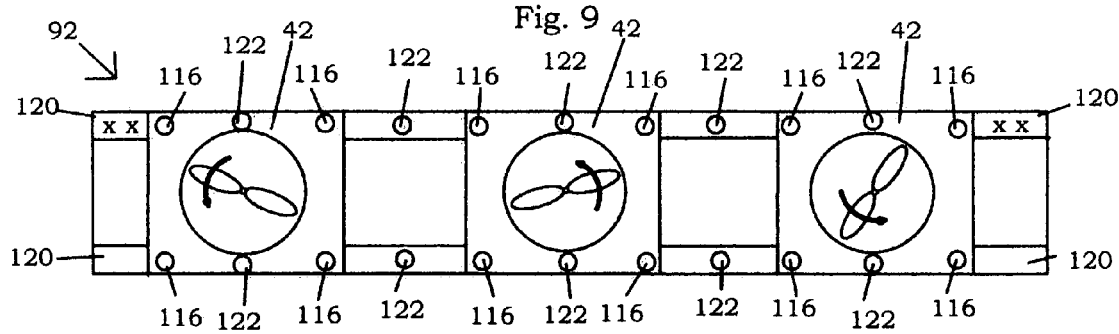
FIG. 9 is an end elevation view of the fans of FIGS. 1, 7 as seen when looking in the direction of air flow.

For purposes of completeness in the drawings, FIG. 9 is a front elevation view of fan frame 92 looking in the direction of air flow, and especially showing fans 42. As in FIG. 8, fan/baffle braces 122 are shown in FIG. 9 to be in central alignment with and also evenly spaced between each of fans 42, and fan bolts 116 are seen to lie at each of the corners of each fan 42. In both of the upper two corners of FIG. 9, within the uppermost second fan strut 120, there are shown two "x's" that indicate the positions from which prongs 112 extend from the opposite side of that second fan strut 120. (Both of second fan struts 120 are visible in this view, while both of first fan struts 118 are hidden from view, while in FIG. 6 just one of each of first and second fan struts 118–120 was depicted.)

Figure 10:
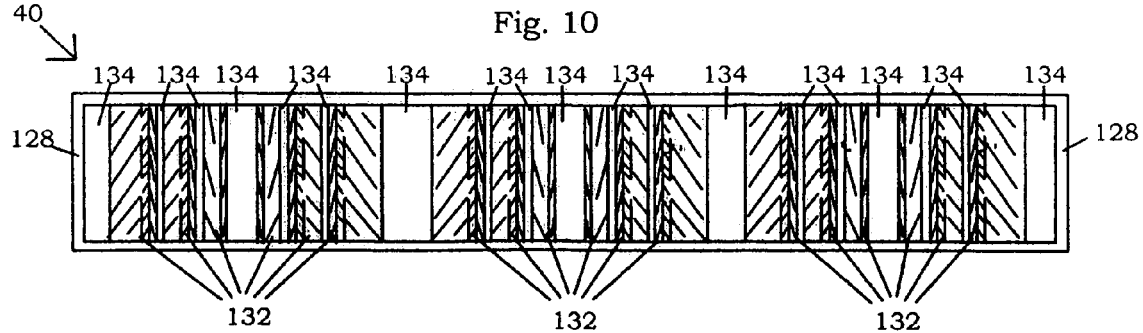
FIG. 10 is an end elevation view of the air baffle of FIG. 1 showing sets of baffle blades and air gaps as seen when looking in the direction of air flow.
Figure 11:
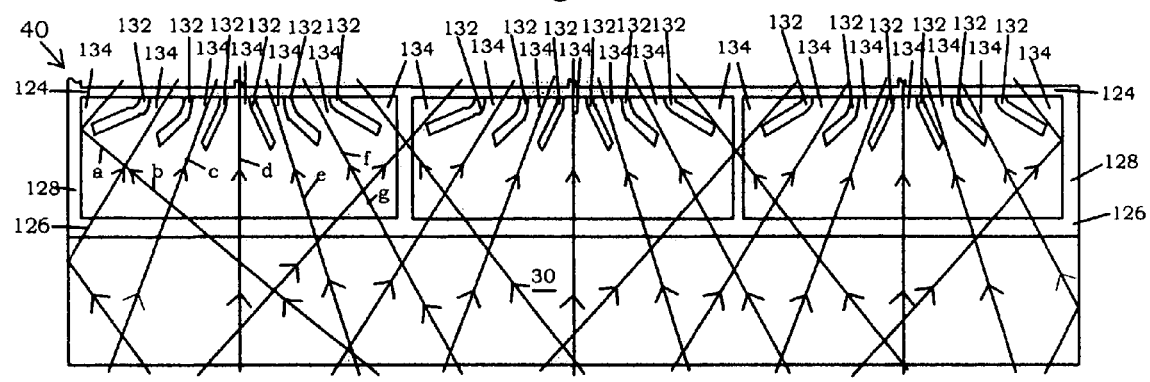
FIG. 11 is a representation in a top plan view looking perpendicularly to the direction of air flow of the air baffle of FIGS. 8, 10 and specifically of a set of air paths as hypothetically derived from the geometry and spacing of the blades of FIGS. 8, 10.

To help illustrate the function of air baffle 40, FIG. 10 is a front elevation view of air baffle 40 looking in the direction of the air flow, and especially showing baffle blades 132. Looked at from that perspective only, it would appear that the passageway for air therethrough is quite constricted, showing only some baffle gaps 134, but FIG. 8 shows that such is not the case in that the bent portions of baffle blades 132, with open spaces designated as baffle gaps 134 on either side thereof, do not so much block the passage of air as simply change its direction. The actual physical obstacle to air flow as it would seem to be from FIG. 10 is thus not actually that, but rather the area defined by the "height" of baffle blades 132 (as seen in the vertical measure of baffle blades 132 in FIG. 10) and the thickness of baffle blades 132. FIG. 11 thus shows a set of relatively open air paths that are presumed to arise from a more realistic view of the geometry and distribution of baffle blades 132. Thus, the lighter lines that are shown in FIG. 11 to lie parallel to the air path labeled "b" illustrate more closely, even in this rough sketch, the actual areas available to the air flow paths, the distance between those two light lines being much greater than the width of the corresponding air gap 134, i.e., the second air gap 134 from the left in FIG. 11. A decrease in available cross-sectional air flow area can of course be compensated for simply by an increase in fan power.

The air paths in FIG. 11 were not calculated mathematically, but are merely visual estimates used for purposes of illustration. (Calculations using precise representations of the exact geometry of each of baffle blades 132 could of course be carried out.) The most leftward of such paths in of FIG. 11, labeled "a," is seen to divert the air path a greater amount than is seen in the next two rightward air paths, as expected from the fact that the planes that make up the most leftward of baffle blades 132 are placed so as to make the greatest angles with the normal to fans 42, that normal of course being the direction of air conduit 44, i.e., the "gross" or cumulative air flow path. The air path labeled "a" thus shows the greatest angular diversion from that air flow path. Then to proceed to the right, the next air path, labeled "b," shows less diversion, and finally the third path, labeled "c," diverts the air path the least, except for the air path labeled "d" that lies along the central axis of the first fan 42 and is bounded symmetrically on each side by the third and fourth baffle blades 132 from the left, the "d" air path thus proceeding along the normal to fan 42. In proceeding on to the right of the central axis of that first fan 42, the pattern just shown by the air paths labeled "a," "b," and "c" is repeated in the air paths labeled "e," "f," and "g," except that it appears in reverse order, since the distribution pattern of the three baffle blades 132 to the right of that central axis is the mirror image of the pattern to the left. That pattern as to the six baffle blades 132 associated with this most leftward fan 42 is then twice repeated with regard to the other two fans 42. A perspective view of one end of an air baffle 40 having the multi-planar baffle blades 132 of FIG. 11 is shown in FIG. 12.

Figure 12:
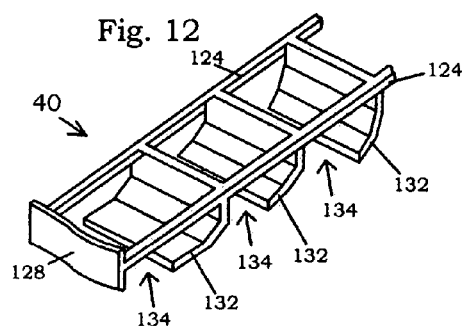
FIG. 12 is a perspective view of a set of multi-planar baffle blades of the air baffle of FIGS. 8, 10.
Figure 13:
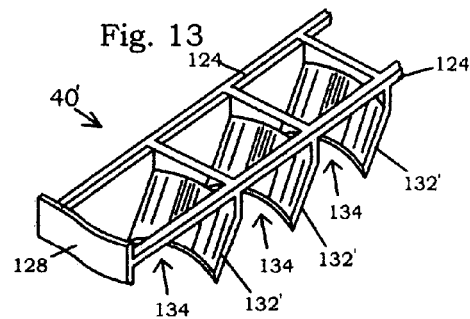
FIG. 13 is a perspective view of a set of alternative curved baffle blades of the air baffle of FIGS. 8, 10.

FIG. 13 is a perspective view of an alternative air baffle 40' in which alternative baffle blades 132' are formed not from planes as were those of FIGS. 8, 11–12, but rather from curves. The latter feature alters the direction of air flow not only in the transverse direction between interior walls 26, i.e., along the lengths of rectangular filter media packets 28 and HEPA filter 30, but also across the shorter width (or height when installed) of air baffle 40' and hence across the widths of filter media packets 28 and HEPA filter 30. The best combination of these different types of baffle blades 132, 132', and the particular curved or planar shapes of each such baffle blade 132, 132' can be established by routine laboratory testing by a person of ordinary skill in the art. Other alternative shapes may also be considered, and all such variations are to be taken as falling within the spirit and scope of the invention.

Further in the interest of extending useful filter life with respect to the filter medium itself, it is shown in FIGS. 1–2 that all of filter media packets 28 will be both reflectively and rotationally symmetric about a central axis identified as shown, for example, along line E in FIG. 4. Since it will not likely be possible to achieve a fully evenly distributed air flow even with the use of air baffle 40, there will be areas within the cross-sections of filter media packets 28 (and also HEPA filter 30) that will be utilized more than others. It will then be useful periodically both to rotate around the short central axis and to "flip over" around the long central axis of the rectangular filter media packets 28, so that any remaining areas of excess use of the filter material will at least be moved around within the air flow pattern as predetermined by fans 42 and air baffle 40 and thereby extend the useful life of the filter medium. Standard laboratory procedures known to a person of ordinary skill in the art, whether by using colored absorbable gases or using test gases for which the absorption will leave a record or can be recorded electronically, are available that will "map" the distribution of the air stream over the cross-sectional areas encompassed by filter media packets 28 and HEPA filter 30 when installed. For economic reasons, such tests would use test papers and the like in lieu of the actual filter media packets 28 and HEPA filter 30. Similar tests can be used to test the efficacy and design of various types of air baffle 40. Confirmative tests can also be carried out on the actual filter media packets 28 and HEPA filter 30.

The detailed structure of a filter media packet 28 is shown in FIGS. 14–17. As in the filter media packets of the Lindsay apparatus, filter media packets 28 are fabricated by a process wherein mutually facing, hole-containing plates having a sheet of non-woven material adjacent each of those facing plate surfaces are brought together with a quantity of the filter medium material disposed therebetween, that material being in an amount sufficient to cause portions of the non-woven material to extrude outwardly through those holes, thereby to pack the medium particles together so as to form a packed bed filter. Unlike the Lindsay packet, however, the hole-containing plates of filter media packets 28 are a part of a box-like structure having walls, not unlike an ordinary plastic soap dish. The principal advantages of the packed bed filter are that (a) it maximizes the quantity of filter medium to which polluted air will be exposed; (b) the close contact between filter media particles that results from such packing reduces the possibility of there being any voids in the medium through which air might pass without being purified (i.e., to "channel"); and ©) the possibility that such voids might be formed as a result of vibration when the filter has been placed in use is also reduced.

Figure 14:
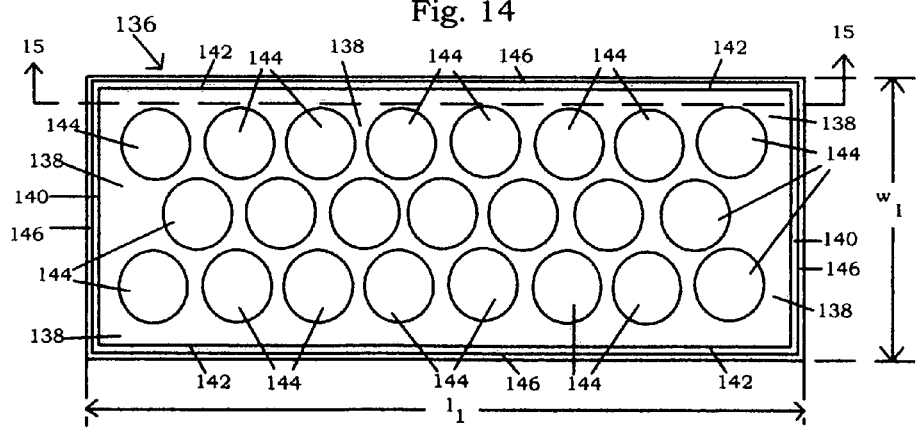
FIG. 14 is a top plan view of a first (inner) portion of a filter media packet 28.

In FIG. 14, there is shown in top plan view a first (inner) portion of a filter media packet 28 constituting a first packet frame 136, which in this preferred embodiment is an open rectangular box-like structure having a first packet base plane 138 to which are connected at right angles thereto first packet end walls 140 and first packet side walls 142, all of such walls being alternately interconnected to form a rectangle and having a common height. ("Alternately interconnected" means that an end wall connects to a side wall which connects to a second end wall which connects to a second side wall which then connects to that initial end wall.) Within first packet base plane 138 there are disposed a multiplicity of filter access holes 144 through which the air to be purified will pass into or out of the filter medium, depending upon the orientation with which the filter media packet 28 was placed within PAP 10.

Figure 15:
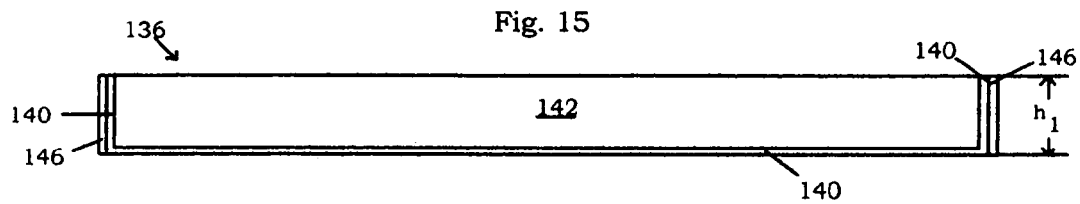
FIG. 15 is a cross-sectional side elevation view of the first portion of a filter media packet 28 of FIG. 14.

Optionally, on the external sides of first packet end walls 140 and first packet side walls 142, there will be provided a thin first contact layer 146 that is formed of a material that is both compressible and resilient, and of which the outer surface thereof has a very low coefficient of friction, e.g., Teflon®. First contact layer 146 makes easier the assembly of a filter media packet 28 and ensures that the contact between first packet frame 136 and a second packet frame 146 will be airtight. Although being difficult to show the same in FIGS. 14–15, first contact layer 146 would ordinarily be much thinner than both first packet frame 136 and second packet frame 146. The exterior width and length of first packet frame 136 are shown and defined in FIG. 14 by the terms w1 and l1, respectively. FIG. 15 is a cross-sectional side elevation view of first contact layer 146 of FIG. 14, taken along the line 15—15 of FIG. 14, and is presented in order to show and define the exterior height h1 of first packet frame 136 of FIG. 14.

Figure 16:
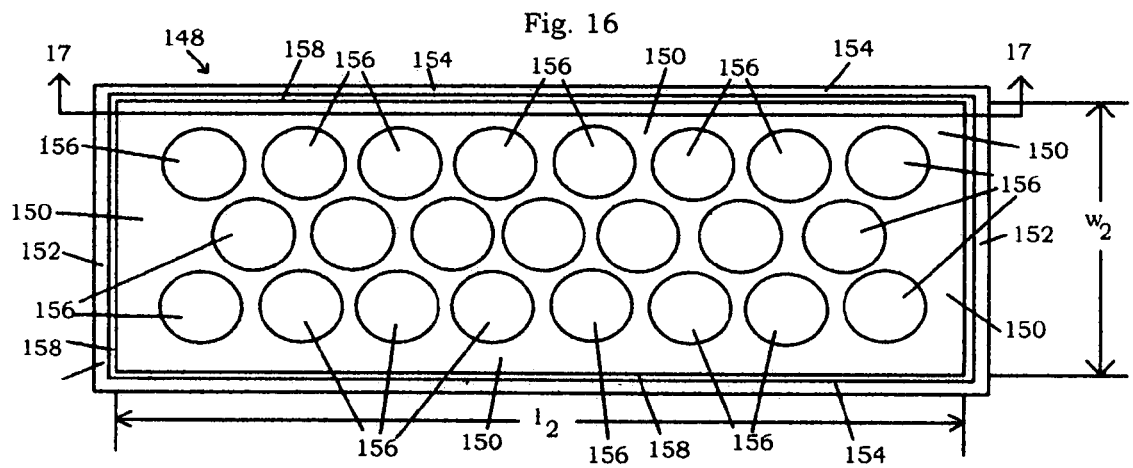
FIG. 16 is a top plan view of a second (outer) portion of a filter media packet 28.

FIG. 16 is a top plan view of a second (outer) portion of a filter media packet, i.e., second packet frame 148, and is formed similarly to first packet frame 136. That is, second packet frame 148 has a second packet base plane 150 to which are connected at right angles two second packet end walls 152 and second packet side walls 154 that are likewise alternately interconnected, and second packet base plane 150 has disposed therethrough an array of second filter access holes 156. Optionally, a thin second contact layer 158 is disposed along the interior sides of second packet end walls 152 and second packet side walls 154. First contact layer 146 lies on the exterior surface of first packet frame 136, and second contact layer 158 lies on the interior surface of second packet frame 148, in order that first, second contact layers 146, 158 will be in contact one with the other when second packet frame 148 is placed over first packet frame 136. The dimensions of interest of second packet frame 148, which in this case are interior dimensions and take into account the presence of second contact layer 158, are shown and defined as the width w2 and length l2. These dimensions are established so that, in slight amounts, w1>w2 and l1>l2. First and second contact layers 146, 158 become mutually facing when first packet frame 136 is placed within second packet frame 148, and first packet frame 136 thus fits tightly within second packet frame 148 as first and second contact layers 146, 158 are slid one against the other, thereby to eliminate any possible air gaps therebetween.

Figure 17:
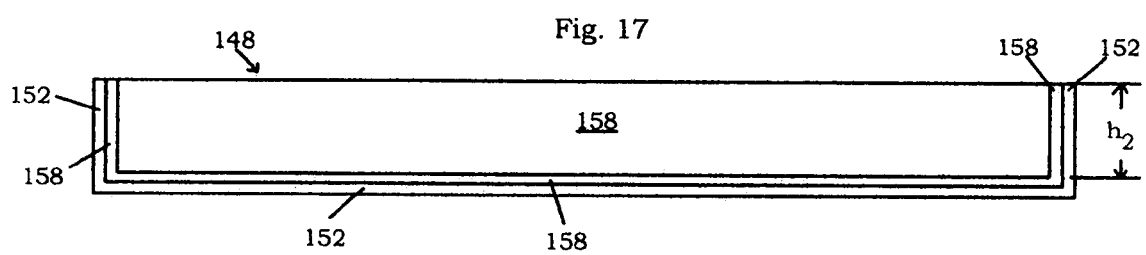
FIG. 17 is a cross-sectional side elevation view of the second portion of a filter media packet 28 of FIG. 16.

FIG. 17 is a cross-sectional side elevation view of second packet frame 148 of FIG. 16, taken along the line 17—17 of FIG. 16, and is presented in order to show and describe the interior height h2 of second packet frame 148 of FIG. 17, wherein to a very small amount h1<h2. The inequalities w1>w2 and l1>l2 are established such that the larger dimensions of w1 and l1 are only slightly larger than w2 and l2, respectively, i.e., sufficient to require a force fit whereby to preclude there being any air gaps between first packet frame 136 and second packet frame 148. The amount by which h1<h2 will also be slight, and is intended only to ensure that in the event a smaller amount of filter medium was placed into the filter media packet 28 being constructed than had been intended, there will be no obstruction by first packet base plane 138 that would prevent first packet frame 136 from being placed within second packet frame 148 with sufficient force to form a packed bed. All of the air that passes through air conduit 44 through the spaces that are allocated for filter media packets 28, until that air reaches HEPA filter 30, is thus forced to pass only through first and second filter access holes 144, 156 and of course through the filter medium disposed therebetween.

Figure 18:
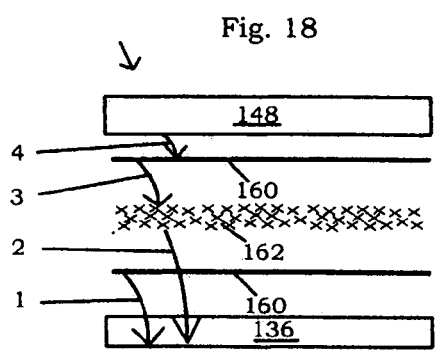
FIG. 18 is a front elevation view of a first method of assembling a filter media packet that uses free filter media.

FIG. 18 now shows one manner of constructing a filter medium packet 28 as follows:
(1) a first sheet of non-woven material 160 is placed atop first packet base plane 138 within the interior of first packet frame 136, wherein non-woven material 160 has dimensions that will cover first packet base plane 138 essentially entirely.
(2) a predetermined amount of filter medium 162 is poured over the top of the non-woven material 160 that was installed in Step 1;
(3) a second sheet of non-woven material 160 is placed atop the filter medium 162 that was placed within first packet frame 136 in Step 2; and
(4) second packet frame 148 is force fit over the top of first packet frame 136 with sufficient force to form filter medium 162 into a packed bed. Step 4 may preferably carried out using a pre-calibrated drill press or the like (not shown).

Figure 19:
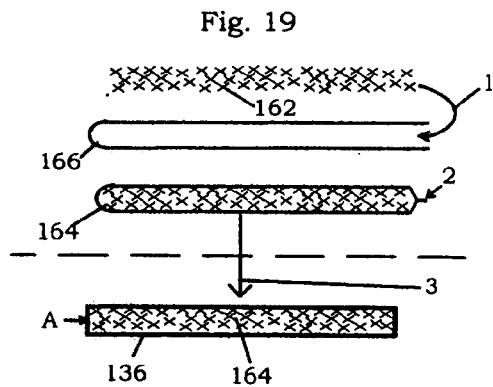
FIG. 19 is a front elevation view of a second method of assembling a filter media packet that uses a filter medium bag.

FIG. 19 shows an alternative method of constructing a filter medium packet 28 that involves pre-packaging of filter medium 162, the steps of which are shown below. (For reasons of simplicity in the drawing, first and second contact layers 146, 158 are not shown, and other elements also previously shown are not labeled in FIG. 19.) The steps of this method are as follows:
(1) a filter medium bag 164 is separately formed as firstly an empty sack 166 that is open on one end, and that is then filled with a predetermined amount of filter medium 162;
(2) the filter medium sack 166 formed in Step 1 is sealed, as by heat sealing, to form a filter medium bag 164;
(3) the filter medium bag 164 formed in Step 2 is placed within first packet frame 136; and
(4) and second packet frame 148 is then force fit over first packet frame 136, preferably with the use of a drill press or the like (not shown) to ensure that filter medium 162 is compressed into a packed bed.

The horizontal dashed line in FIG. 19 is intended to distinguish between two sets of steps of the method that can be carried out in separate locations. That is, in terms of manufacturing time it may be advantageous to form quantities of filter medium bags 164 in one place, as by way of an "assembly line," and then locate a quantity of such filter medium bags 164 proximally to a like supply of first and second packet frames 136, 148, together with a drill press or the like as suggested in Step 4 above, thereby to permit completion in the process of forming filter media packets 28. The only difference between the final filter medium packets 28 as shown in FIGS. 18 and 19 is that in the method of FIG. 19, in the final product the filter medium 162 is contained within a fully sealed structure having a heat seal on one end. (The structures labeled "A" and "B" in FIG. 19 are different views of the same structure.)

Figure 20:
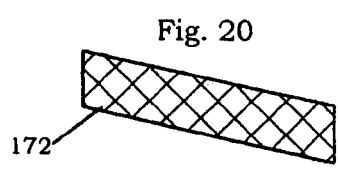
FIG. 20 is a top plan view of an alternative wire mesh that could be used in a filter media packet.

For purposes merely of holding filter medium 162 without seeking significant extrusion of non-woven material 160 from filter media packet 28, first and second packet frames 136, 148 might instead employ a wire mesh 168 such as that shown in FIG. 20 in lieu of first and second packet base planes 138, 150, and any such variation is deemed to fall within the spirit and scope of the claims appended hereto.

A preferred sequencing of filter media packets 28 had been identified by repetitive testing using the Lindsay Cabin Air Purifier and is shown below, although the sequence can be modified both to treat a less demanding pollutant mix targeted in certain geographical areas during particular seasons of the year, or to treat more dangerous environments arising from such circumstances as natural disasters or warfare. A different emphasis can also be placed on particular types of filter media on the basis of specific anticipated threats, e.g., whether normal "big city" or freeway pollution, or on the battlefield where the Cabin Air Purifier would be placed in tanks, armored personnel vehicles and the like. Similar special environments would include law enforcement facilities or military bases, nuclear power plants, embassies, other government office buildings and the like, where in any of these cases the threat may be that of chemical (e.g., nerve gases), biological (e.g., anthrax, small pox, etc.) or nuclear agents (i.e., "dirty bombs," more technically known as "radiological dispersion agents") .Chemisorbents that are known to bond to and hence render ineffective specific ones of such agents can be added to one or more filter media packets. For example, octachlorodiphenyl urea in a rigid foam can evidently be used to capture mustard gas (dichlorodiethyl sulphide) as described in Hart '939 (although Hart neither describes nor suggests usage of such a rigid foam for purifying air for breathing).

In more general terms, however, the "normal" sequencing of filter media packets 28 within PAP 10 (as was claimed in the above-cited Lindsay application) is as follows:
 1. Desiccant—adsorbent packet containing various types of silica gel, zeolite and/or molecular sieves, within a gross particulate medium envelope.
 2. Sulfur oxides, ozone and other gases adsorbent packet containing various types of packed activated carbon granules or pellets, within a gross particulate medium envelope.
 3. Catalyst packet to break down carbon monoxide, within a gross particulate medium envelope. To function properly the catalyst packet must be preceded in the air-flow stream by desiccants to reduce moisture and by adsorbents to capture sulfur and other acids which could poison the catalyst and make it inoperative.
 4. Benzene and other hydrocarbon adsorbent packet containing various types of coconut based activated carbon granules, beads, and/or powder, within a gross particulate medium envelope.
 5. HEPA pleated filter (tested to remove 99.97% of particles measuring 0.3 microns in diameter and more efficient for both smaller and larger particles), approximately three inches deep.
 6. A second filter of the type indicated in 4 above, or a coconut-based carbon impregnated fiber medium, to capture any residual gases and odors. (The HEPA filter in the embodiment of PAP 10 described herein has the approximate dimensions 17.82 cm (seven (7) inches) long, 6.45 cm (three (3) inches) wide, and 2.54 cm (one (1) inch) deep.)

As best understood, when ambient air enters PAP 10, the first filter media packet 28, of the dessicant—adsorbent type, acts to reduce the humidity of the incoming air and thereby to protect the effectiveness of a subsequent pelletized carbon packet and a catalyst packet. Desiccant—adsorbent packet 28 preferably contains 50% silica gel and 50% zeolite. Such silica gel can be obtained from Silica Gel Desiccant Products Company and the zeolite can be Zeochem® 24-01, 4×8, type 4A. The next-following pelletized carbon packet 28 will contain packed coal based activated carbon pellets to adsorb ozone, along with many other gases including sulfur oxides, for which one source of the coal-based carbon is the pelletized type G352-60 made by the PICA company (France). Acidic gases such as sulfur oxides that contaminate the air may also contaminate the catalyst, so for effective operation of the catalyst those pollutants are preferably to be removed from the air before that air reaches the next following catalyst packet 28. The activated carbon so employed in pelletized carbon packet 28 may also contain impregnates to act as chemisorbents.

Preferably, the indicated catalyst packet 28 should specifically include a base metal catalyst that is somewhat moisture tolerant and effective at ambient air temperatures to break down carbon monoxide, for which purpose the CARULITE® 300 12×20 mesh catalyst made by the Carus Chemical Company may be used. The next-following carbon packet 28 is intended to adsorb benzene and other hydrocarbons, and contains coconut-based, activated carbon granules and/or beads necessary to adsorb the smaller hydrocarbon molecules, for which 50% PICA Nacar P-20×50 and 50% PICA G55-C may be used. For the various products listed herein that were noted as being useable, other sources of similar products may be found by a person of ordinary skill in the art, and the utility of any such similar products in fulfilling the needs of the invention as have been noted may easily be established through like skill.

Following its development during the Manhattan Project for the protection of workers from the danger of airborne radioactive particles, the HEPA filter has found much wider use, as in the home air cleaner and in vacuum cleaners. For HEPA filter 18, one source is the "True HEPA Filter" provided by Eureka®, Bloomington, Ill., 61741 (Phone: 1-840-286-2926, at the eureka.com web site) for some of its upright vacuums. The particular HEPA filter of PAP 10 has the approximate dimensions of 7 inches width, 3 inches height, and 1 inch thickness, and in light of the ready availability of the Eureka) HEPA filter and its good fit to the size of the human body, the dimensions of PAP 10 have been selected to match that size. The HEPA filter has been tested to capture 99.97% of particles measuring 0.3 microns in diameter, being generally more efficient for both smaller and larger particles. That size range includes a wide variety of pollutants, especially including particulate matter (PM-10 and PM-2.5) from vehicle exhausts and many bacteria and viruses.

(Most known bacteria fall in the size range of 0.2 to 2.0 micrometers. N. W. Pirie, *Annu. Rev. Microbiol.*, 27, 119 1973). Viruses (in an aquatic environment) fall in the size range of 0.2 micrometers and smaller. I. Sommaruga, R. M. Krossbacher, W. Salvenmoser, J. Catalan, R. Psenner, *Aquatic Microb. Ecol.*, 9, 305 (1995). The theoretical minimum size that a cell can have is about 0.14 micrometers. L. Koch, *Annu. Rev. Microbiol.*, 50, 317 (1996).)

Optionally, a carbon impregnated filter ("CIF") 170 as shown in FIG. 1 can be placed after HEPA filter 30, for which a coconut carbon wrap from Hepworth may be used, and that would then serve to capture any residual gases and odors. CIF 170 can be formed simply by loosely folding the indicated fiber and taping the resultant folds of fiber together, and is thus distinct in structure from the filter media packets 28 previously discussed (and of course from HEPA filter 30).

FIG. 21 shows an instance of PAP 10 as worn on the back of a user in accordance with the description of PAP 10 as presented herein so far, together with air pipes and one form of gas mask or respirator. Also shown in FIG. 21 (as well as FIG. 22) is a battery pack 172 on a belt, with appropriate DC power connection 174 to power inlet 76 of PAP 10. FIG. 22 shows an alternative embodiment of PAP 10 in the form of a shoulder pouch 176 that differs from the apparatus previously shown and described herein only in having a pouch strap 178 in lieu of the shoulder straps 54 and chest strap 56 shown in FIG. 1. For placement on quadrupedal animals, such as the horses used by mounted police, PAP 10, preferably of a larger size for such a larger animal, might be strapped onto the animal's back or neck, or hung beneath the animal's neck or chest area, and would operate in the same way as does the PAP 10 described herein except for the need for human intervention in setting up the device for operation.

Figure 23:
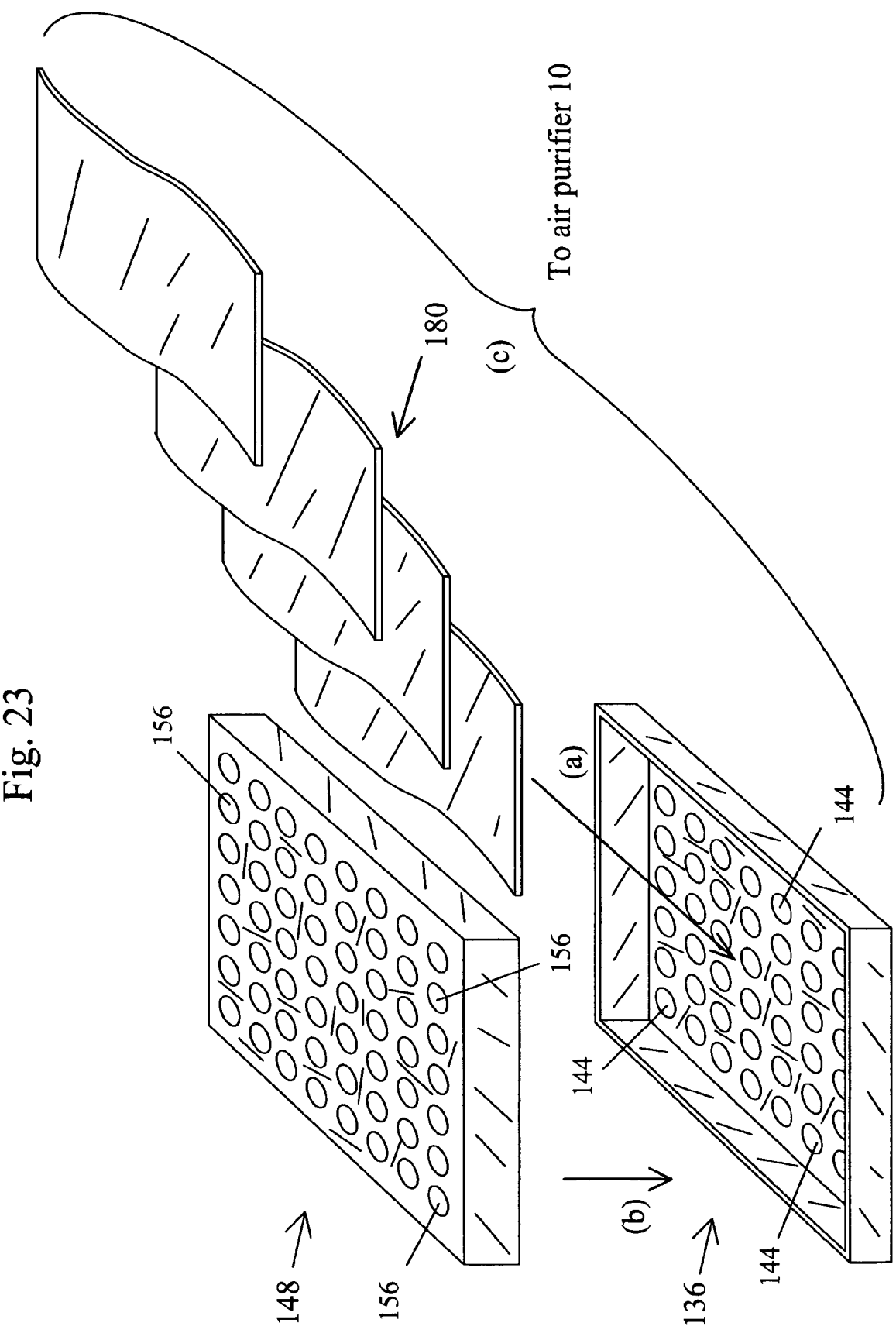
FIG. 23 is a perspective view of a filter media packet 28 showing the use of a substitute nonwoven material, taken from the thermal insulation of a user's clothing, that can be employed in an emergency situation.

Some of the nonwoven materials used in air filters have other uses, such as for thermal insulation in clothing, especially those shown in the Braun et al. patents noted earlier. Another feature of PAP 10 is that because of the nature of filter media packets 28, the content thereof can easily be replaced in the field. Emergency circumstances might arise wherein the threat of polluted or even dangerous air may exist, but after some time in use the adsorption capability of the Personal Air Purifier may have been exhausted. In such case, substitute filter material can be obtained from any thermal insulation within the clothing of the user, cut into the appropriate size and shape, and as shown in FIG. 23, packed into a filter media packet 28 for use until such emergency situation has been avoided. Specifically, FIG. 23 shows first and second packet frames 136, 148, between which are being inserted a number of pre-cut thermal insulation materials 180, shown as neatly cut sheets as taken from the clothes of the user so as to provide air filtration under an emergency situation. FIG. 3 is of course illustrative only, and thermal insulation materials 180 may be acquired in bits and pieces or other irregular forms, cut could still be packed into filter media packet 28.

INDUSTRIAL APPLICABILITY

Personal Air Purifier 10 provides to a user means for obtaining clean air to breathe when in an environment in which the ambient air is polluted by various gases and particulate matter, whether by fumes from traffic, noxious fumes such as diisocyanates from industrial operations; operations in underground mines; agricultural and farming operations; operations involving the removal of asbestos; construction projects involving paint sprays, cement, and other particulate matter; road and similar engineering projects involving the use of paving materials or the moving about of earth; gas leaks and other hazardous materials ("HAZMAT") events; fires, including forest fires as well as structural fires; battlefield events; chemical, biological or nuclear laboratory work and any associated production work; or chemical, biological or nuclear terrorist attacks, the term "nuclear" especially including the so-called "dirty bomb" attack, more technically known as the use of "radiological dispersion agents." Users of PAP 10 will include the general public as to city or freeway traffic fumes, or of course as to terrorist attacks as well; firefighters, police, especially with respect to investigations of suspected "drug labs"; medical personnel, hazardous material ("HAZMAT") and other "first responder" personnel; military personnel; miners; the general public again as to escaping from a fire or other hazardous event, and further as to persons suffering from asthma, bronchitis, or other ailments for which the quality of the air being breathed is especially critical.

The invention having thus been shown and described, it will be understood by those of ordinary skill in the art that other arrangements and dispositions of the several components of the invention, the descriptions of which given herein are intended to be illustrative only and not limiting, may be made without departing from the spirit and scope of the invention, which must be identified and determined only from the following claims and equivalents thereof.

I claim:

1. A self-powered, wearable personal air purifier comprising:
   a) a main frame;
   b) an air conduit disposed in a longitudinal direction along said main frame and having an air inlet and an air outlet;
   c) a multiplicity of air filters disposed transversely across said air conduit;
   d) a HEPA filter disposed transversely across said air conduit;
   e) one or more fans disposed transversely across said air conduit;
   f) a power source electrically connectable to said one or more fans;
   g) an airtight cover disposed around said air conduit exclusive of said air inlet and said air outlet;
   h) an air blocking sheet disposed over said air conduit in forced contact therewith, wherein an inward pressure is applied to said air blocking sheet by the stretching of said air blocking sheet over a set of walls surrounding said air conduit; and
   i) body attaching means by which said air purifier is removably attachable to an animal body, including humans.

2. The air purifier of claim 1 wherein said multiplicity of air filters is disposed across said air conduit in a pre-selected sequence adapted to target specific air pollutants that have been identified as being particularly dangerous to human health.

3. The air purifier of claim 2 wherein said pre-selected sequence is further characterized by including one or more filter media packets taken from the list comprising:
   a) a desiccant—adsorbent package containing within a gross particulate medium envelope therein a quantity of filter medium comprising various types of silica gel, zeolite and/or molecular sieves;
   b) an adsorbent packet containing within a gross particulate medium envelope therein a filter medium adapted to adsorb sulfur oxides, ozone and other gases, said filter medium comprising packed activated carbon;
   c) a catalyst packet to break down carbon monoxide, within a gross particulate medium envelope;
   d) an adsorbent packet containing within a gross particulate medium envelope therein a filter medium adapted to adsorb benzene and other hydrocarbons, said filter medium comprising various types of coconut based activated carbon;
   e) a HEPA pleated filter; and
   f) a carbon based filter.

4. The air purifier of claim 3 wherein said carbon based filter designated as filter f) therein is a second instance of the type therein designated as filter d).

5. The air purifier of claim 3 wherein said carbon based filter designated as filter f) thereof is a coconut-based carbon impregnated fiber medium.

6. The air purifier of claim 1 further characterized in having an air baffle disposed transversely across said air conduit at a longitudinal position next adjacent to said one or more fans.

7. The air purifier of claim 6 wherein said air baffle is further characterized in having a multiplicity of baffle blades in the form of structures disposed generally coplanar with the direction of air flow through said air conduit, but further comprising one or more bends in the structure of each of said multiplicity of baffle blades, said bends lying along bend lines disposed transversely to said direction of air flow, whereby distal portions of said baffle blades become disposed at pre-selected angles to said direction of air flow.

8. The air purifier of claim 1 wherein said cover is fixedly attached to said main frame near to said air outlet and removably attached to said main frame near to said air inlet.

9. The air purifier of claim 8 wherein said cover is formed of an elastic, airtight material, and additionally includes means for drawing said elastic, airtight material free of said main frame at said removable attachment near to said air inlet of said main frame, and means for drawing said elastic, airtight material in a longitudinal direction towards said air outlet of said main frame, thereby to provide access to the interior of said air conduit.

10. The air purifier of claim 1 wherein said main frame is further characterized in having an elongate, open-topped structure including a bottom plate, two end walls, and two side walls wherein said two end walls at opposite ends thereof are interconnected by said two side walls in an airtight manner, and all of said end walls and said side walls are connected in an airtight manner around the periphery of said bottom plate.

11. The air purifier of claim 10 wherein said cover when fully installed is disposed so as to lay over top edges of said side walls in an airtight relationship.

12. The air purifier of claim 10 wherein said main frame is further characterized in including two mutually parallel interior walls, disposed parallel to said two side walls at a pre-determined distance inwardly from said two side walls, said side walls having a pre-determined height, and said two interior walls having a pre-determined height that is greater than said height of said side walls.

13. The air purifier of claim 12 wherein said cover when fully installed is disposed so as to lay over top edges of said interior walls in an airtight relationship.

14. The air purifier of claim 6 being further characterized in having at least one compressible and airtight air blocking sheet disposed along an edge surface of each said multiplicity of air filters, of said HEPA filter, of said one or more fans, and of said air baffle, said disposition also lying immediately adjacent an inner surface of said cover, whereby inward pressure from said cover will tend to compress the material of said at least one air blocking sheet into any spatial gaps between said inner surface of said cover and said edge surfaces of each of said multiplicity of air filters, of said HEPA filter, of said one or more fans, and of said air baffle, thereby to preclude any air passage there through.

15. The air purifier of claim 1 wherein said main frame is further characterized in containing at least one battery compartment adaptable to receive and store one or more batteries that are in an electrically connectable relationship with said one or more fans, said at least one battery compartment further being disposed separately from said air conduit in an airtight relationship.

16. The air purifier of claim 15 wherein each of said at least one battery compartment is separated in an airtight manner from said air conduit by one of said interior walls.

17. The air purifier of claim 15 being further characterized in having an air flow switch disposed electrically between said one or more batteries and said one or more fans, and being adapted to make or break electrical connection there between at the option of a user.

18. The air purifier of claim 1 wherein said cover is further characterized in having access means adapted to be opened and closed so as to provide access to said at least one battery compartment at the option of a user.

19. The air purifier of claim 1 wherein at least one of said multiplicity of air filters comprises a filter media packet.

20. The air purifier of claim 19 wherein said filter media packet is a packed bed filter media packet.

21. A method of providing emergency air filtration capability within an air purifier, comprising:
   a) taking from the clothing of the user an amount of pollutant absorbing thermal insulation material that will fit into a filter media packet;
   b) providing an empty filter media packet and placing said amount of pollutant absorbing thermal insulation into said filter media packet; and
   c) placing said filter media packet now containing said amount of pollutant absorbing thermal insulation into said air purifier.

22. The air purifier of claim 1 further comprising side walls and first and second end walls disposed around the periphery of said air conduit such that said side walls establish the longitudinal extent of said main frame, and said first and second end walls establish the lateral extent of said main frame, wherein said first end wall has a greater length than the longitudinal extent of said main side walls, while said second end wall is shorter than the longitudinal extent of said main walls, whereby the inner surface of said air blocking sheet is placed into forcible contact with said main side walls and first and second end walls, thus to provide a tighter contact between said airtight cover and said main side walls and first and second end walls.

* * * * *